US012618219B2

(12) United States Patent
Clark et al.

(10) Patent No.:      US 12,618,219 B2
(45) Date of Patent:          May 5, 2026

(54) AUTOMATED COUPLING OF AN IMPLEMENT TO AN IMPLEMENT CARRIER OF A POWER MACHINE

(71) Applicant: Doosan Bobcat North America, Inc., West Fargo, ND (US)

(72) Inventors: Christopher Clark, Claremont, CA (US); Aman Fatehpuria, West Bengal (IN); Jingnan Shi, Shanghai (CN); Jessica A. Lupanow, Thousand Oaks, CA (US); David E. Olumese, Geneva (CH); Gabriel L. Rubin, Santa Rosa, CA (US); Darien J. Joso, Beverly Hills, CA (US); Kayla Yamada, Upland, CA (US)

(73) Assignee: Doosan Bobcat North America, Inc., West Fargo, ND (US)

( * ) Notice: Subject to any disclaimer, the term of this patent is extended or adjusted under 35 U.S.C. 154(b) by 985 days.

(21) Appl. No.: 16/400,545

(22) Filed: May 1, 2019

(65) Prior Publication Data

US 2019/0338809 A1      Nov. 7, 2019

Related U.S. Application Data

(60) Provisional application No. 62/665,160, filed on May 1, 2018, provisional application No. 62/665,167, filed on May 1, 2018.

(51) Int. Cl.
*E02F 3/34*          (2006.01)
*B60W 10/20*          (2006.01)
(Continued)

(52) U.S. Cl.
CPC ........... *E02F 3/3414* (2013.01); *B60W 10/20* (2013.01); *F16D 23/12* (2013.01); *G05D 1/0212* (2013.01);
(Continued)

(58) Field of Classification Search
CPC ........... F16D 1/02; F16D 23/12; G05D 1/021; G05D 1/0287; G05D 1/02; B60D 1/36;
(Continued)

(56) References Cited

U.S. PATENT DOCUMENTS 11,041,284 B2 * 6/2021 Fey ......................... E02F 9/265
2015/0045992 A1 2/2015 Ashby et al.
(Continued)

FOREIGN PATENT DOCUMENTS

DE      102013002622      *  2/2013
GB         2554523 A         4/2018
WO      2018/160960 A1      9/2018

OTHER PUBLICATIONS

International Search Report and Written Opinion mailed Jul. 22, 2019 for International Application No. PCT/US2019/030185 filed May 1, 2019, 13 pages.

*Primary Examiner* — Hitesh Patel
*Assistant Examiner* — Terry C Buse
(74) *Attorney, Agent, or Firm* — Westman Champlin & Koehler, P.A.

(57)          ABSTRACT

Disclosed embodiments include power machine, control systems for power machines, and methods of controlling a power machine to automatically couple an implement to an implement carrier of the power machine. Sensors are used to identify positions of a power machine and of an implement, such as a bucket, to be coupled to the implement carrier of the power machine. Control methods are implemented to allow the power machine to be automatically controlled to couple the implement to the implement.

13 Claims, 15 Drawing Sheets

(51) Int. Cl.
    *F16D 23/12*        (2006.01)
    *G05D 1/00*        (2024.01)

(52) U.S. Cl.
    CPC ......... *G05D 1/0223* (2013.01); *G05D 1/0225*
          (2013.01); *G05D 1/0272* (2013.01); *B60W*
        *2300/121* (2013.01); *B60W 2554/80* (2020.02)

(58) Field of Classification Search
    CPC . B60D 1/26; B60D 15/00; B60D 1/06; B60D
          1/62; B60W 30/06; B60R 1/00
    See application file for complete search history.

(56)              References Cited

U.S. PATENT DOCUMENTS

| 2016/0319509 A1* | 11/2016 | Zent | E02F 3/432 |
| 2017/0191244 A1* | 7/2017 | Berkemeier | E02F 9/2045 |
| 2017/0227969 A1* | 8/2017 | Murray | A01D 42/00 |

* cited by examiner

100

Linear velocity model data.

Complete linear velocity model.

Change in angle calculations.

Angular velocity model data.

Complete rotational velocity model.

AUTOMATED COUPLING OF AN IMPLEMENT TO AN IMPLEMENT CARRIER OF A POWER MACHINE

CROSS-REFERENCE TO RELATED APPLICATIONS

The present application is based on and claims the benefit of U.S. provisional patent application Ser. No. 62/665,160, filed May 1, 2018, and U.S. provisional patent application Ser. No. 62/665,167, filed May 1, 2018, the contents of which are hereby incorporated by reference in their entireties.

BACKGROUND

This disclosure is directed toward power machines. More particularly, this disclosure is directed toward systems for, and methods of, automatically coupling an implement to an implement carrier of a power machine.

Power machines, for the purposes of this disclosure, include any type of machine that generates power for the purpose of accomplishing a particular task or a variety of tasks. One type of power machine is a work vehicle. Work vehicles are generally self-propelled vehicles that have a work device, such as a lift arm (although some work vehicles can have other work devices) that can be manipulated to perform a work function. Work vehicles include loaders, excavators, utility vehicles, tractors, and trenchers, to name a few examples.

Many power machines have implement carriers to which various types of implements can be removably coupled. For example, various loaders have an implement carrier rotatably coupled to a lift arm for receiving various implements. Such implement carriers advantageously allow an operator to use various implements on a single machine and to change implements as may be desired. Typically, coupling an implement, such as a bucket, to an implement carrier of a power machine requires a series of operational steps by the operator of the power machine, including putting the power machine in alignment with the implement.

The discussion above is merely provided for general background information and is not intended to be used as an aid in determining the scope of the claimed subject matter.

SUMMARY

Disclosed embodiments include a power machine, control systems for power machines, and methods of controlling a power machine to automatically couple an implement to an implement carrier of the power machine. Sensors are used to identify positions of a power machine and of an implement, such as a bucket, to be coupled to the implement carrier of the power machine. Control methods are implemented to allow the power machine to be automatically controlled to couple the implement to the implement.

Disclosed embodiments include power machines (100; 200; 300) having a frame (110; 210), a power system (120; 220) supported by the frame, a traction system (140; 240) supported by the frame and powered by the power system to controllably propel the power machine over a support surface, and an implement interface (170; 270) including an implement carrier (272; 370) configured to receive and secure an implement (305) to the power machine. The power machines also have a control system (400; 450; 500) configured to control the traction system to automatically guide the power machine to the implement and to control the power machine to automatically couple the implement to the implement carrier.

In some embodiments, the power machines further comprise a sensor system (452) configured to provide data indicative of a position of the power machine relative to the implement. Drive motors (454) of the traction system are configured to cause the traction system to move the power machine over the support surface. In these embodiments, the control system is configured to control the drive motors, as a function of the position of the power machine relative to the implement as indicated by the data from the sensor system, to automatically guide the power machine to the implement.

In some embodiments, the power machines further comprise a lift arm assembly (230) having at least one lift arm (234) which supports the implement interface. At least one lift actuator (238; 456) is coupled to the lift arm assembly and to the frame and is configured to raise and lower the at least one lift arm. At least one tilt actuator (235; 458) is coupled to the implement interface and to the lift arm assembly and is configured to rotate the implement carrier relative to the lift arm assembly. The control system is further configured to control the at least one lift actuator and the at least one tilt actuator to automatically couple the implement to the implement carrier.

In some embodiments, the control system is configured to determine a desired position state of the power machine and to compare the desired position state to a current position state estimate of the power machine to determine a difference between the current position state estimate and the desired position state. The controller is also configured to generate a control input, required to move the power machine, as a function of the difference between the current position state estimate and the desired position state. In some embodiments, the control system is configured to determine the desired position state of the power machine using the data from the sensor system (452).

In some embodiments of the power machine, the control system is configured to: generate a current x position of the power machine, a current y position of the power machine, and a current angular position of the power machine relative to an angular position in which the power machine would be positioned for coupling the implement to the implement carrier; generate a next desired x position of the power machine and a next desired y position of the power machine that move the power machine toward the implement; calculate a desired angular position as a function of a difference between the desired y position and the current y position and as a function of a difference between the desired x position and the current x position; calculate a difference between the desired angular position and the current angular position; determine a desired forward velocity as a function of a difference between the current x position and the desired x position and as a function of a difference between the current y position and the desired y position; determine a desired rotational velocity as a function of the difference between the desired angular position and the current angular position; and determine whether the difference between the desired angular position and the current angular position is greater than a threshold value; generate the control input, required to move the power machine, as a function of the desired rotational velocity if the difference between the desired angular position and the current angular position is greater than the threshold value; and generate the control input, required to move the power machine, as a function of the desired forward velocity if the difference between the desired angular position and the current angular position is less than the threshold value.

In some embodiments of the power machine, the control system is one of a proportional controller, a point tracking controller, a proportional integral derivative (PID) controller, or a sequential proportional integral derivative (SPID) controller.

Also disclosed are methods of coupling an implement (305) to an implement carrier (272; 370) of a power machine (100; 200; 300). The method includes, obtaining data, from a sensor system (452), indicative of a position of the power machine relative to the implement; and controlling a traction system (140: 240) of the power machine, using a control system (400; 450; 500) and as a function of the data indicative of the position of the power machine relative to the implement, to automatically guide the power machine over a support surface to the implement.

In some embodiments, the traction system of the power machine further comprises drive motors (454) configured to cause the traction system to move the power machine over the support surface. In some of these embodiments, controlling the traction system further comprises using the control system to generate a control input, as a function of the position of the power machine relative to the implement as indicated by the data from the sensor system, and controlling the drive motors using the control input to automatically guide the power machine to the implement.

In some embodiments, the power machine further comprises a lift arm assembly (230) having at least one lift arm (234) which supports the implement carrier, at least one lift actuator (238; 456) coupled to the lift arm assembly and to the frame and configured to raise and lower the at least one lift arm, and at least one tilt actuator (235; 458) coupled to the implement carrier and to the lift arm assembly and configured to rotate the implement carrier relative to the lift arm assembly. The method can further comprise, in such embodiments, using the control system to automatically control the at least one lift actuator and the at least one tilt actuator to couple the implement to the implement carrier when the power machine is in position proximate the implement.

In some embodiments of a method, using the control system to generate the control input further comprises: determining a desired position state of the power machine using the data from the sensor system; comparing the desired position state to a current position state estimate of the power machine to determine a difference between the current position state estimate and the desired position state; and generating the control input as a function of the difference between the current position state estimate and the desired position state.

In some embodiments, the method further comprises, generating (802) a current x position of the power machine, a current y position of the power machine, and a current angular position of the power machine relative to an angular position in which the power machine would be positioned for coupling the implement to the implement carrier; generating (804) a next desired x position of the power machine and a next desired y position of the power machine that move the power machine toward the implement; calculating (806) a desired angular position as a function of a difference between the desired y position and the current y position and as a function of a difference between the desired x position and the current x position; calculating (808) a difference between the desired angular position and the current angular position; determining (810) a desired forward velocity as a function of a difference between the current x position and the desired x position and as a function of a difference between the current y position and the desired y position; determining (812) a desired rotational velocity as a function of the difference between the desired angular position and the current angular position; determining (814) whether the difference between the desired angular position and the current angular position is greater than a threshold value; generating (816) the control input, required to move the power machine, as a function of the desired rotational velocity if the difference between the desired angular position and the current angular position is greater than the threshold value; and generating (818) the control input, required to move the power machine, as a function of the desired forward velocity if the difference between the desired angular position and the current angular position is less than the threshold value.

In various embodiments, using the control system to generate the control input further comprises using a proportional controller to generate the control input, using a point tracking controller to generate the control input, using a proportional integral derivative (PID) controller to generate the control input, or using a sequential proportional integral derivative (SPID) controller to generate the control input.

This Summary and the Abstract are provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DRAWINGS

DETAILED DESCRIPTION

The concepts disclosed in this discussion are described and illustrated with reference to exemplary embodiments. These concepts, however, are not limited in their application to the details of construction and the arrangement of components in the illustrative embodiments and are capable of being practiced or being carried out in various other ways. The terminology in this document is used for the purpose of description and should not be regarded as limiting. Words such as "including," "comprising," and "having" and variations thereof as used herein are meant to encompass the items listed thereafter, equivalents thereof, as well as additional items.

Disclosed embodiments include power machine, control systems for power machines, and methods of controlling a power machine to automatically couple an implement to an implement carrier of the power machine. Sensors are used to identify positions of a power machine and of an implement, such as a bucket, to be coupled to the implement carrier of the power machine. Control methods are implemented to allow the power machine to be automatically controlled to couple the implement to the implement carrier without requiring a skilled operator to control the various power machine movements conventionally necessary to accomplish the task. Disclosed embodiments provide various advantages over conventional techniques for coupling an implement to the implement carrier of a power machine. For example, some embodiments minimize the time required to connect an implement (seconds to connection) to an implement carrier. Further, some embodiments reduce a number of operator interactions required to setup for connection. Further still, some embodiments provide other advantages such as automatic stopping of the coupling process when an emergency button or input is pressed or actuated. In some embodiments, the coupling process can be initiated with an operator input and then be completed autonomously by the control system of the power machine.

Figure 2:
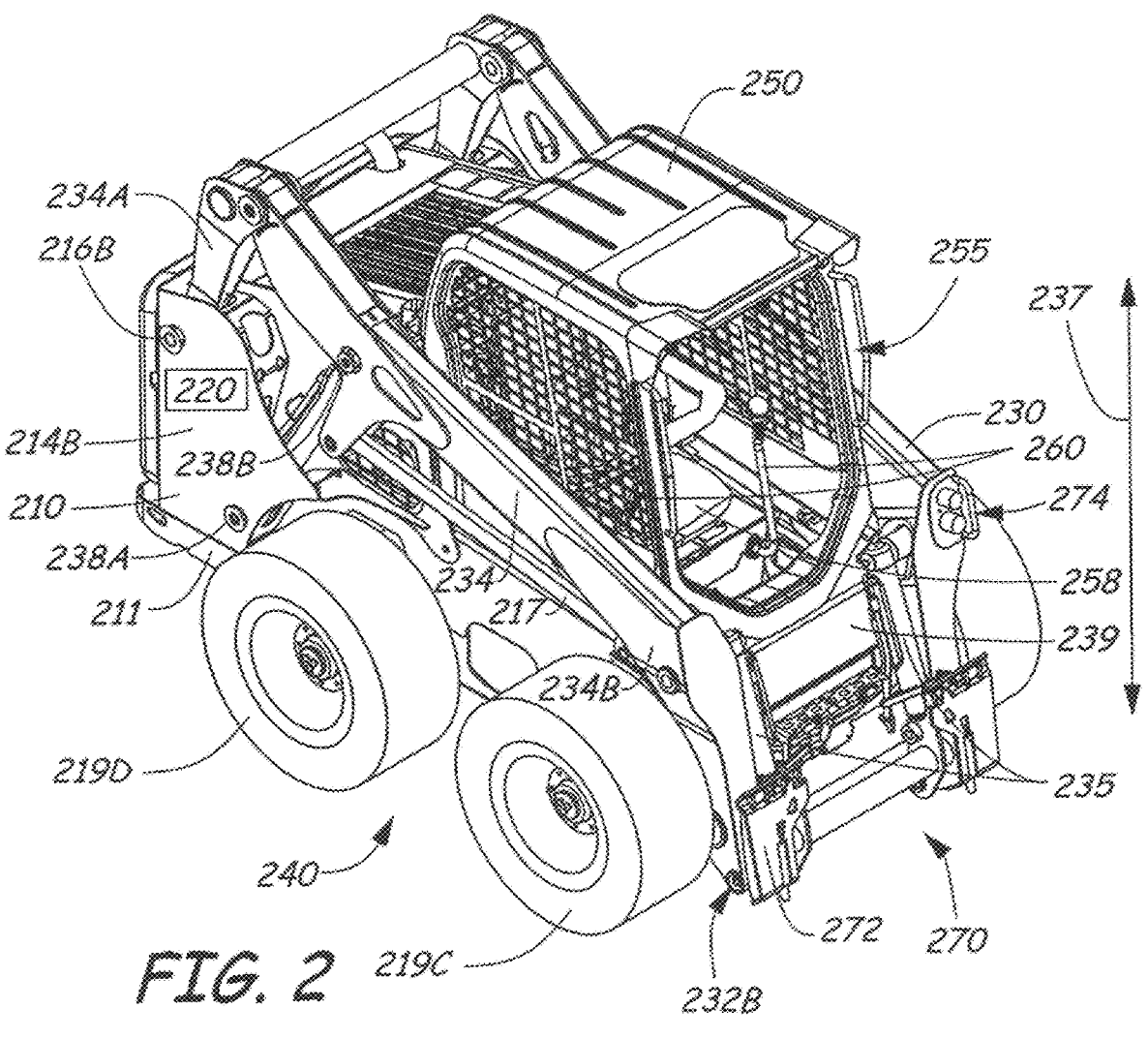
FIGS. 2-3 illustrate perspective views of a representative power machine in the form of a skid-steer loader of the type on which the disclosed embodiments can be practiced.
Figure 3:
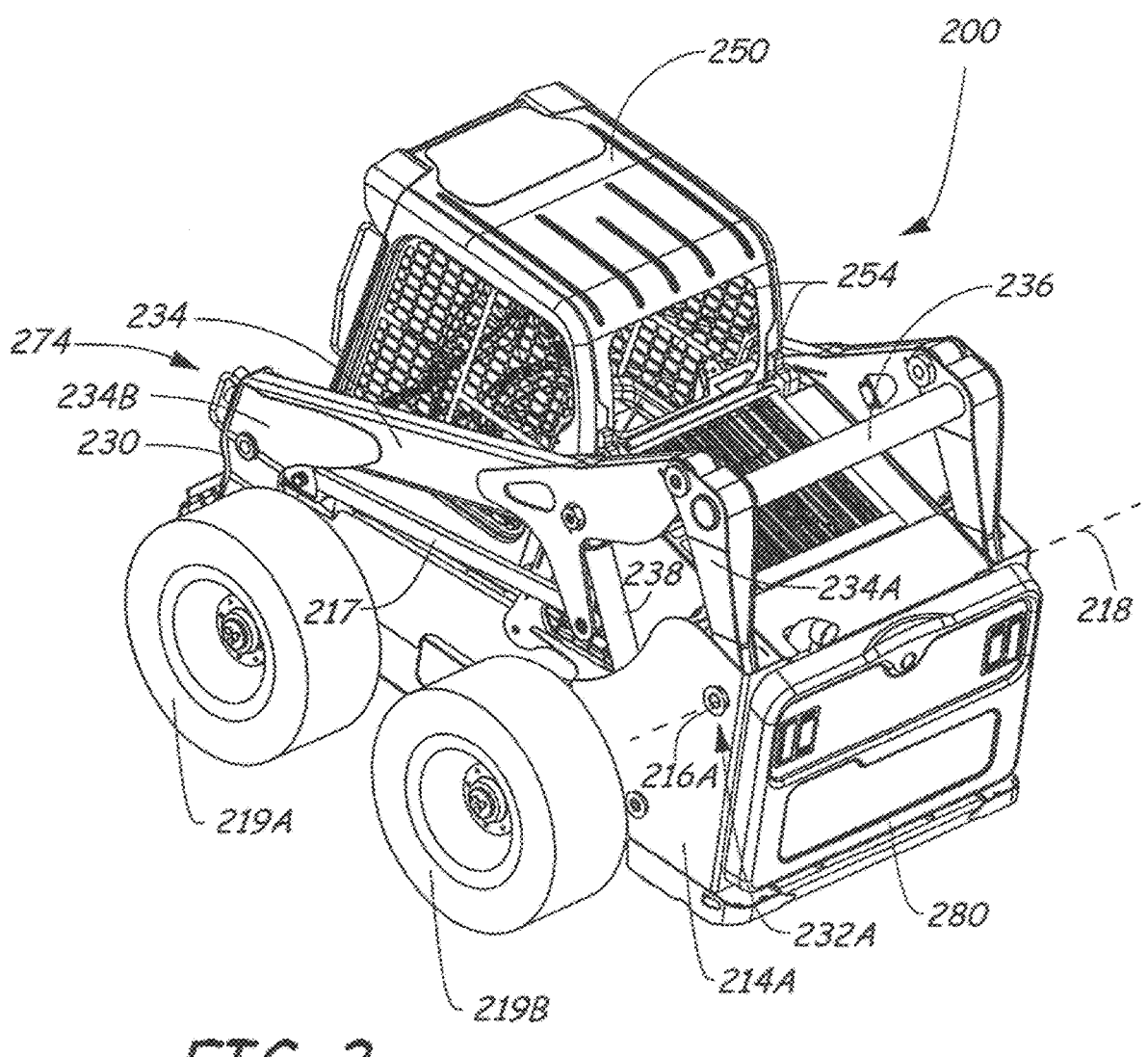

These concepts can be practiced on various power machines, as will be described below. A representative power machine on which the embodiments can be practiced is illustrated in diagram form in FIG. 1 and one example of such a power machine is illustrated in FIGS. 2-3 and described below before any embodiments are disclosed. For the sake of brevity, only one power machine is illustrated and discussed as being a representative power machine. However, as mentioned above, the embodiments below can be practiced on any of a number of power machines, including power machines of different types from the representative power machine shown in FIGS. 2-3. Power machines, for the purposes of this discussion, include a frame, at least one work element, and a power source that is capable of providing power to the work element to accomplish a work task. One type of power machine is a self-propelled work vehicle. Self-propelled work vehicles are a class of power machines that include a frame, work element, and a power source that is capable of providing power to the work element. At least one of the work elements is a motive system for moving the power machine under power.

Figure 1:
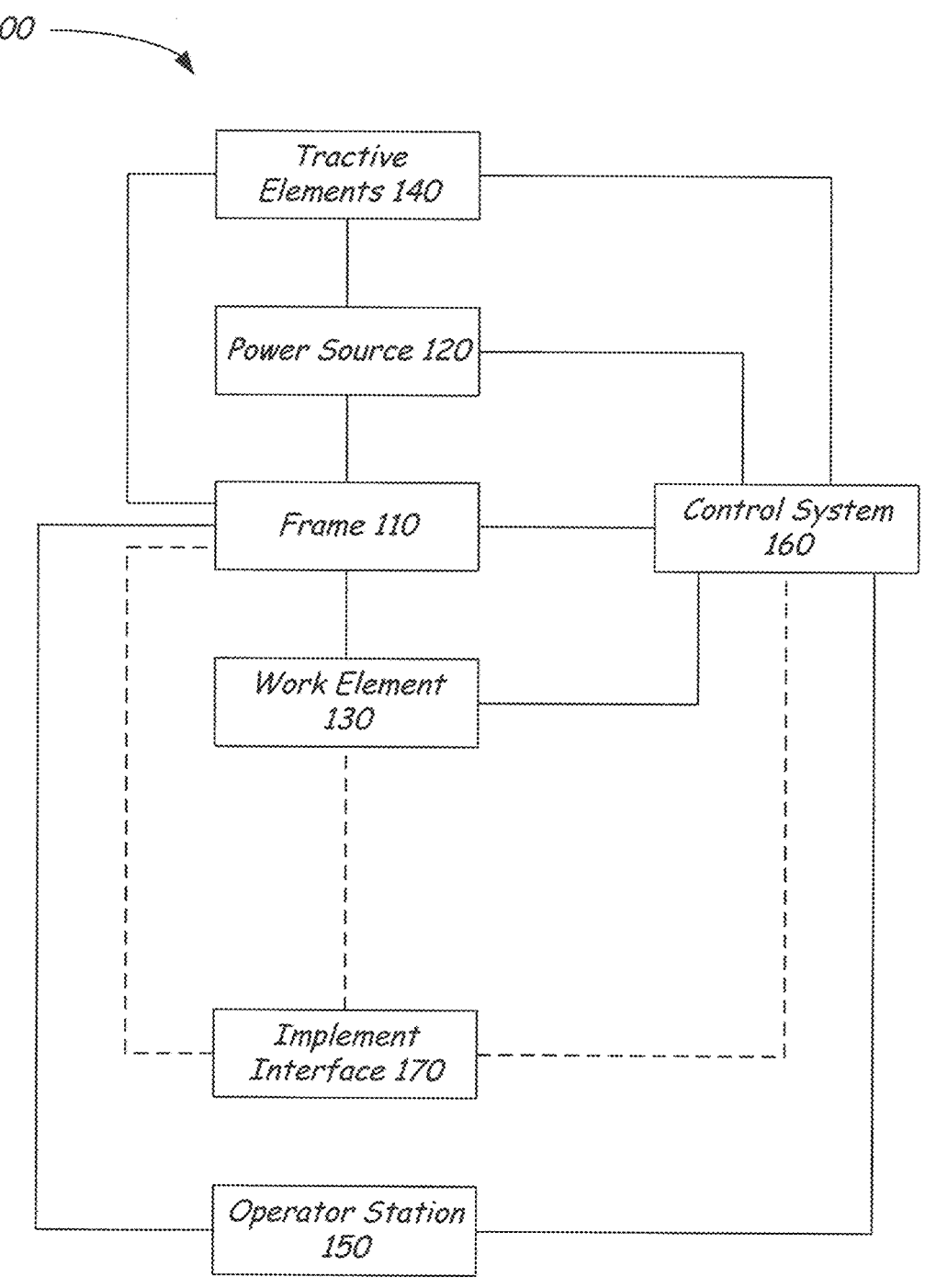
FIG. 1 is a block diagram illustrating functional systems of a representative power machine on which embodiments of the present disclosure can be advantageously practiced.

FIG. 1 is a block diagram that illustrates the basic systems of a power machine 100, which can be any of a number of different types of power machines, upon which the embodiments discussed below can be advantageously incorporated. The block diagram of FIG. 1 identifies various systems on power machine 100 and the relationship between various components and systems. As mentioned above, at the most basic level, power machines for the purposes of this discussion include a frame, a power source, and a work element. The power machine 100 has a frame 110, a power source 120, and a work element 130. Because power machine 100 shown in FIG. 1 is a self-propelled work vehicle, it also has tractive elements 140, which are themselves work elements provided to move the power machine over a support surface and an operator station 150 that provides an operating position for controlling the work elements of the power machine. A control system 160 is provided to interact with the other systems to perform various work tasks at least in part in response to control signals provided by an operator.

Certain work vehicles have work elements that are capable of performing a dedicated task. For example, some work vehicles have a lift arm to which an implement such as a bucket is attached such as by a pinning arrangement. The work element, i.e., the lift arm can be manipulated to position the implement for the purpose of performing the task. The implement, in some instances can be positioned relative to the work element, such as by rotating a bucket relative to a lift arm, to further position the implement. Under normal operation of such a work vehicle, the bucket is intended to be attached and under use. Such work vehicles may be able to accept other implements by disassembling the implement/work element combination and reassembling another implement in place of the original bucket. Other work vehicles, however, are intended to be used with a wide variety of implements and have an implement interface such as implement interface 170 shown in FIG. 1. At its most basic, implement interface 170 is a connection mechanism between the frame 110 or a work element 130 and an implement, which can be as simple as a connection point for attaching an implement directly to the frame 110 or a work element 130 or more complex, as discussed below.

On some power machines, implement interface 170 can include an implement carrier, which is a physical structure movably attached to a work element. The implement carrier has engagement features and locking features to accept and secure any of a number of implements to the work element. One characteristic of such an implement carrier is that once an implement is attached to it, it is fixed to the implement (i.e. not movable with respect to the implement) and when the implement carrier is moved with respect to the work element, the implement moves with the implement carrier. The term implement carrier as used herein is not merely a pivotal connection point, but rather a dedicated device specifically intended to accept and be secured to various different implements. The implement carrier itself is mountable to a work element 130 such as a lift arm or the frame 110. Implement interface 170 can also include one or more power sources for providing power to one or more work elements on an implement. Some power machines can have a plurality of work element with implement interfaces, each of which may, but need not, have an implement carrier for receiving implements. Some other power machines can have a work element with a plurality of implement interfaces so that a single work element can accept a plurality of implements simultaneously. Each of these implement interfaces can, but need not, have an implement carrier.

Frame 110 includes a physical structure that can support various other components that are attached thereto or positioned thereon. The frame 110 can include any number of individual components. Some power machines have frames that are rigid. That is, no part of the frame is movable with respect to another part of the frame. Other power machines have at least one portion that is capable of moving with respect to another portion of the frame. For example, excavators can have an upper frame portion that rotates with respect to a lower frame portion. Other work vehicles have articulated frames such that one portion of the frame pivots with respect to another portion for accomplishing steering functions.

Frame 110 supports the power source 120, which is configured to provide power to one or more work elements 130 including the one or more tractive elements 140, as well as, in some instances, providing power for use by an attached implement via implement interface 170. Power from the power source 120 can be provided directly to any of the work elements 130, tractive elements 140, and implement interfaces 170. Alternatively, power from the power source 120 can be provided to a control system 160, which in turn selectively provides power to the elements that capable of using it to perform a work function. Power sources for power machines typically include an engine such as an internal combustion engine and a power conversion system such as a mechanical transmission or a hydraulic system that is configured to convert the output from an engine into a form of power that is usable by a work element. Other types of power sources can be incorporated into power machines, including electrical sources or a combination of power sources, known generally as hybrid power sources.

FIG. 1 shows a single work element designated as work element 130, but various power machines can have any number of work elements. Work elements are typically attached to the frame of the power machine and movable with respect to the frame when performing a work task. In addition, tractive elements 140 are a special case of work element in that their work function is generally to move the power machine 100 over a support surface. Tractive elements 140 are shown separate from the work element 130 because many power machines have additional work elements besides tractive elements, although that is not always the case. Power machines can have any number of tractive elements, some or all of which can receive power from the power source 120 to propel the power machine 100. Tractive elements can be, for example, track assemblies, wheels attached to an axle, and the like. Tractive elements can be mounted to the frame such that movement of the tractive element is limited to rotation about an axle (so that steering is accomplished by a skidding action) or, alternatively, pivotally mounted to the frame to accomplish steering by pivoting the tractive element with respect to the frame.

Power machine 100 includes an operator station 150 that includes an operating position from which an operator can control operation of the power machine. In some power machines, the operator station 150 is defined by an enclosed or partially enclosed cab. Some power machines on which the disclosed embodiments may be practiced may not have a cab or an operator compartment of the type described above. For example, a walk behind loader may not have a cab or an operator compartment, but rather an operating position that serves as an operator station from which the power machine is properly operated. More broadly, power machines other than work vehicles may have operator stations that are not necessarily similar to the operating positions and operator compartments referenced above. Further, some power machines such as power machine 100 and others, whether or not they have operator compartments or operator positions, may be capable of being operated remotely (i.e. from a remotely located operator station) instead of or in addition to an operator station adjacent or on the power machine. This can include applications where at least some of the operator controlled functions of the power machine can be operated from an operating position associated with an implement that is coupled to the power machine. Alternatively, with some power machines, a remote control device can be provided (i.e. remote from both of the power machine and any implement to which is it coupled) that is capable of controlling at least some of the operator controlled functions on the power machine.

FIGS. 2-3 illustrate a loader 200, which is one particular example of a power machine of the type illustrated in FIG. 1 where the embodiments discussed below can be advantageously employed. Loader 200 is a skid-steer loader, which is a loader that has tractive elements (in this case, four wheels) that are mounted to the frame of the loader via rigid axles. Here the phrase "rigid axles" refers to the fact that the skid-steer loader 200 does not have any tractive elements that can be rotated or steered to help the loader accomplish a turn. Instead, a skid-steer loader has a drive system that independently powers one or more tractive elements on each side of the loader so that by providing differing tractive signals to each side, the machine will tend to skid over a support surface. These varying signals can even include powering tractive element(s) on one side of the loader to move the loader in a forward direction and powering tractive element(s) on another side of the loader to mode the loader in a reverse direction so that the loader will turn about a radius centered within the footprint of the loader itself. The term "skid-steer" has traditionally referred to loaders that have skid steering as described above with wheels as tractive elements. However, it should be noted that many track loaders also accomplish turns via skidding and are technically skid-steer loaders, even though they do not have wheels. For the purposes of this discussion, unless noted otherwise, the term skid-steer should not be seen as limiting the scope of the discussion to those loaders with wheels as tractive elements.

Loader 200 is one particular example of the power machine 100 illustrated broadly in FIG. 1 and discussed above. To that end, features of loader 200 described below include reference numbers that are generally similar to those used in FIG. 1. For example, loader 200 is described as having a frame 210, just as power machine 100 has a frame 110. Skid-steer loader 200 is described herein to provide a reference for understanding one environment on which the embodiments described below related to track assemblies and mounting elements for mounting the track assemblies to a power machine may be practiced. The loader 200 should not be considered limiting especially as to the description of features that loader 200 may have described herein that are not essential to the disclosed embodiments and thus may or may not be included in power machines other than loader 200 upon which the embodiments disclosed below may be advantageously practiced. Unless specifically noted otherwise, embodiments disclosed below can be practiced on a variety of power machines, with the loader 200 being only one of those power machines. For example, some or all of the concepts discussed below can be practiced on many other types of work vehicles such as various other loaders, excavators, trenchers, and dozers, to name but a few examples.

Loader 200 includes frame 210 that supports a power system 220, the power system being capable of generating or otherwise providing power for operating various functions on the power machine. Power system 220 is shown in block diagram form, but is located within the frame 210. Frame 210 also supports a work element in the form of a lift arm assembly 230 that is powered by the power system 220 and is capable of performing various work tasks. As loader 200 is a work vehicle, frame 210 also supports a traction system 240, which is also powered by power system 220 and is capable of propelling the power machine over a support surface. The lift arm assembly 230 in turn supports an implement interface 270, which includes an implement carrier 272 that is capable of receiving and securing various implements to the loader 200 for performing various work tasks and power couplers 274, to which an implement can be coupled for selectively providing power to an implement that might be connected to the loader. Power couplers 274 can provide sources of hydraulic or electric power or both. The loader 200 includes a cab 250 that defines an operator station 255 from which an operator can manipulate various control devices 260 to cause the power machine to perform various work functions. Cab 250 can be pivoted back about an axis that extends through mounts 254 to provide access to power system components as needed for maintenance and repair.

The operator station 255 includes an operator seat 258 and a plurality of operation input devices, including control levers 260 that an operator can manipulate to control various machine functions. Operator input devices can include buttons, switches, levers, sliders, pedals and the like that can be stand-alone devices such as hand operated levers or foot pedals or incorporated into hand grips or display panels, including programmable input devices. Actuation of operator input devices can generate signals in the form of electrical signals, hydraulic signals, and/or mechanical signals. Signals generated in response to operator input devices are provided to various components on the power machine for controlling various functions on the power machine. Among the functions that are controlled via operator input devices on power machine 100 include control of the tractive elements 219, the lift arm assembly 230, the implement carrier 272, and providing signals to any implement that may be operably coupled to the implement.

Loaders can include human-machine interfaces including display devices that are provided in the cab 250 to give indications of information relatable to the operation of the power machines in a form that can be sensed by an operator, such as, for example audible and/or visual indications. Audible indications can be made in the form of buzzers, bells, and the like or via verbal communication. Visual indications can be made in the form of graphs, lights, icons, gauges, alphanumeric characters, and the like. Displays can be dedicated to provide dedicated indications, such as warning lights or gauges, or dynamic to provide programmable information, including programmable display devices such as monitors of various sizes and capabilities. Display devices can provide diagnostic information, troubleshooting information, instructional information, and various other types of information that assists an operator with operation of the power machine or an implement coupled to the power machine. Other information that may be useful for an operator can also be provided. Other power machines, such walk behind loaders may not have a cab nor an operator compartment, nor a seat. The operator position on such loaders is generally defined relative to a position where an operator is best suited to manipulate operator input devices.

Various power machines that are capable of including and/or interacting with the embodiments discussed below can have various different frame components that support various work elements. The elements of frame 210 discussed herein are provided for illustrative purposes and frame 210 is not the only type of frame that a power machine on which the embodiments can be practiced can employ. Frame 210 of loader 200 includes an undercarriage or lower portion 211 of the frame and a mainframe or upper portion 212 of the frame that is supported by the undercarriage. The mainframe 212 of loader 200, in some embodiments is attached to the undercarriage 211 such as with fasteners or by welding the undercarriage to the mainframe. Alternatively, the mainframe and undercarriage can be integrally formed. Mainframe 212 includes a pair of upright portions 214A and 214B located on either side and toward the rear of the mainframe that support lift arm assembly 230 and to which the lift arm assembly 230 is pivotally attached. The lift arm assembly 230 is illustratively pinned to each of the upright portions 214A and 214B. The combination of mounting features on the upright portions 214A and 214B and the lift arm assembly 230 and mounting hardware (including pins used to pin the lift arm assembly to the mainframe 212) are collectively referred to as joints 216A and 216B (one is located on each of the upright portions 214) for the purposes of this discussion. Joints 216A and 216B are aligned along an axis 218 so that the lift arm assembly is capable of pivoting, as discussed below, with respect to the frame 210 about axis 218. Other power machines may not include upright portions on either side of the frame, or may not have a lift arm assembly that is mountable to upright portions on either side and toward the rear of the frame. For example, some power machines may have a single arm, mounted to a single side of the power machine or to a front or rear end of the power machine. Other machines can have a plurality of work elements, including a plurality of lift arms, each of which is mounted to the machine in its own configuration. Frame 210 also supports a pair of tractive elements in the form of wheels 219A-D on either side of the loader 200.

The lift arm assembly 230 shown in FIGS. 2-3 is one example of many different types of lift arm assemblies that can be attached to a power machine such as loader 200 or other power machines on which embodiments of the present discussion can be practiced. The lift arm assembly 230 is what is known as a vertical lift arm, meaning that the lift arm assembly 230 is moveable (i.e. the lift arm assembly can be raised and lowered) under control of the loader 200 with respect to the frame 210 along a lift path 237 that forms a generally vertical path. Other lift arm assemblies can have different geometries and can be coupled to the frame of a loader in various ways to provide lift paths that differ from the radial path of lift arm assembly 230. For example, some lift paths on other loaders provide a radial lift path. Other lift arm assemblies can have an extendable or telescoping portion. Other power machines can have a plurality of lift arm assemblies attached to their frames, with each lift arm assembly being independent of the other(s). Unless specifically stated otherwise, none of the inventive concepts set forth in this discussion are limited by the type or number of lift arm assemblies that are coupled to a particular power machine.

The lift arm assembly 230 has a pair of lift arms 234 that are disposed on opposing sides of the frame 210. A first end of each of the lift arms 234 is pivotally coupled to the power machine at joints 216 and a second end 232B of each of the lift arms is positioned forward of the frame 210 when in a lowered position as shown in FIG. 2. Joints 216 are located toward a rear of the loader 200 so that the lift arms extend along the sides of the frame 210. The lift path 237 is defined by the path of travel of the second end 232B of the lift arms 234 as the lift arm assembly 230 is moved between a minimum and maximum height.

Each of the lift arms 234 has a first portion 234A of each lift arm 234 is pivotally coupled to the frame 210 at one of the joints 216 and the second portion 234B extends from its connection to the first portion 234A to the second end 232B of the lift arm assembly 230. The lift arms 234 are each coupled to a cross member 236 that is attached to the first portions 234A. Cross member 236 provides increased structural stability to the lift arm assembly 230. A pair of actuators 238, which on loader 200 are hydraulic cylinders configured to receive pressurized fluid from power system 220, are pivotally coupled to both the frame 210 and the lift arms 234 at pivotable joints 238A and 238B, respectively, on either side of the loader 200. The actuators 238 are sometimes referred to individually and collectively as lift cylinders. Actuation (i.e., extension and retraction) of the actuators 238 cause the lift arm assembly 230 to pivot about joints 216 and thereby be raised and lowered along a fixed path illustrated by arrow 237. Each of a pair of control links 217 are pivotally mounted to the frame 210 and one of the lift arms 232 on either side of the frame 210. The control links 217 help to define the fixed lift path of the lift arm assembly 230.

Some lift arms, most notably lift arms on excavators but also possible on loaders, may have portions that are controllable to pivot with respect to another segment instead of moving in concert (i.e. along a pre-determined path) as is the case in the lift arm assembly 230 shown in FIG. 2. Some power machines have lift arm assemblies with a single lift arm, such as is known in excavators or even some loaders and other power machines. Other power machines can have a plurality of lift arm assemblies, each being independent of the other(s).

An implement interface 270 is provided proximal to a second end 232B of the lift arm assembly 234. The implement interface 270 includes an implement carrier 272 that is capable of accepting and securing a variety of different implements to the lift arm 230. Such implements have a complementary machine interface that is configured to be engaged with the implement carrier 272. The implement carrier 272 is pivotally mounted at the second end 232B of the arm 234. Implement carrier actuators 235 are operably coupled the lift arm assembly 230 and the implement carrier 272 and are operable to rotate the implement carrier with respect to the lift arm assembly. Implement carrier actuators 235 are illustratively hydraulic cylinders and often known as tilt cylinders.

By having an implement carrier capable of being attached to a plurality of different implements, changing from one implement to another can be accomplished with relative ease. For example, machines with implement carriers can provide an actuator between the implement carrier and the lift arm assembly, so that removing or attaching an implement does not involve removing or attaching an actuator from the implement or removing or attaching the implement from the lift arm assembly. The implement carrier 272 provides a mounting structure for easily attaching an implement to the lift arm (or other portion of a power machine) that a lift arm assembly without an implement carrier does not have.

Some power machines can have implements or implement like devices attached to it such as by being pinned to a lift arm with a tilt actuator also coupled directly to the implement or implement type structure. A common example of such an implement that is rotatably pinned to a lift arm is a bucket, with one or more tilt cylinders being attached to a bracket that is fixed directly onto the bucket such as by welding or with fasteners. Such a power machine does not have an implement carrier, but rather has a direct connection between a lift arm and an implement.

The implement interface 270 also includes an implement power source 274 available for connection to an implement on the lift arm assembly 230. The implement power source 274 includes pressurized hydraulic fluid port to which an implement can be removably coupled. The pressurized hydraulic fluid port selectively provides pressurized hydraulic fluid for powering one or more functions or actuators on an implement. The implement power source can also include an electrical power source for powering electrical actuators and/or an electronic controller on an implement. The implement power source 274 also exemplarily includes electrical conduits that are in communication with a data bus on the excavator 200 to allow communication between a controller on an implement and electronic devices on the loader 200.

The description of power machine 100 and loader 200 above is provided for illustrative purposes, to provide illustrative environments on which the embodiments discussed below can be practiced. While the embodiments discussed can be practiced on a power machine such as is generally described by the power machine 100 shown in the block diagram of FIG. 1 and more particularly on a loader such as track loader 200, unless otherwise noted or recited, the concepts discussed below are not intended to be limited in their application to the environments specifically described above.

Figure 4:
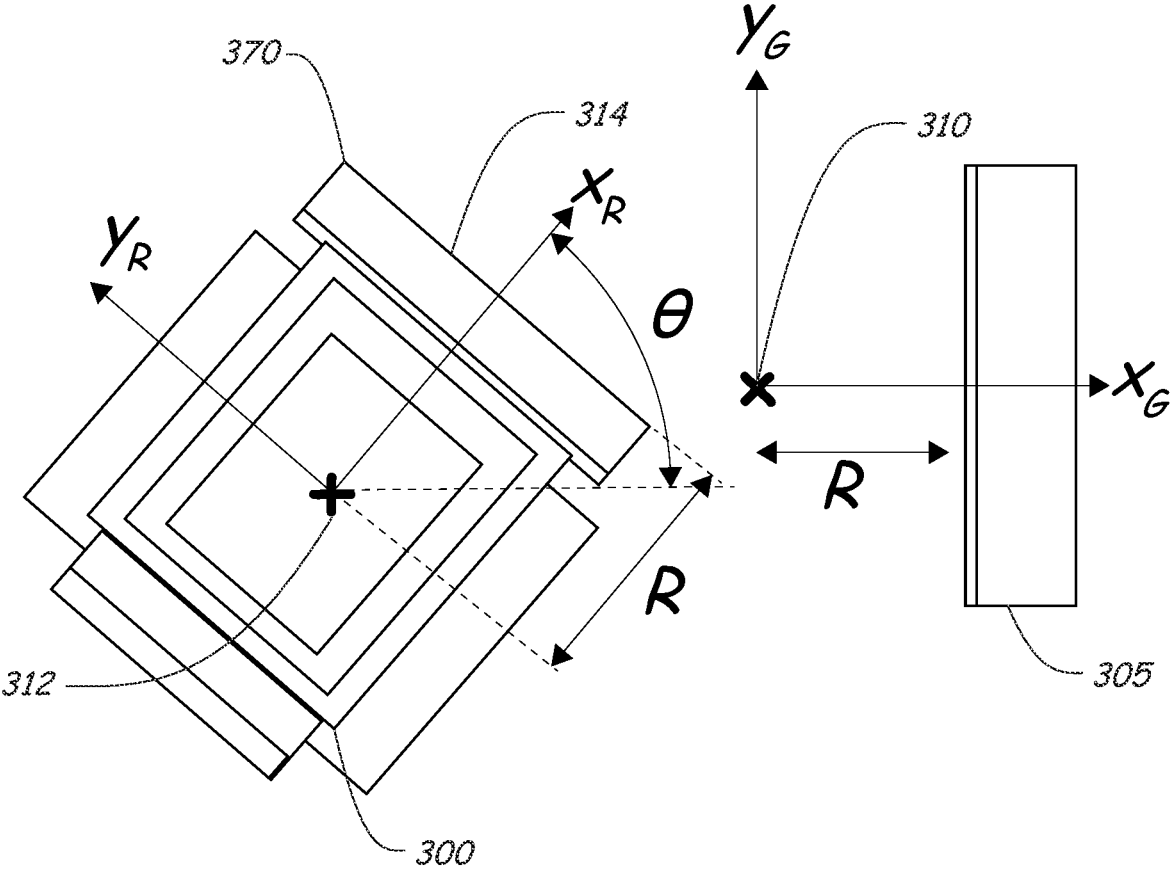
FIG. 4 is a diagrammatic top view illustration of a power machine and an implement, with a global coordinate system used in the power machine control system to define the machine's position and heading relative to the implement.
Figure 5:
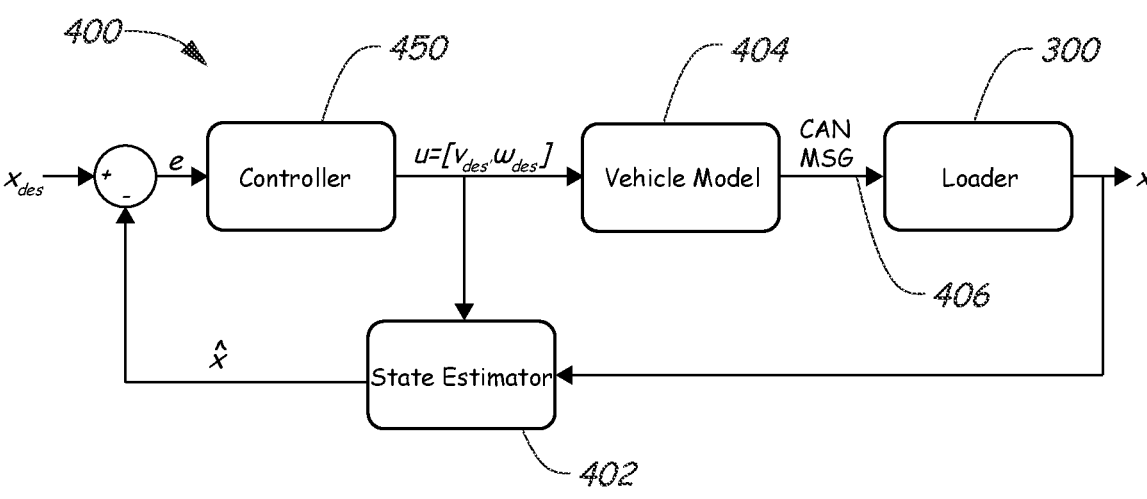
FIG. 5 is an illustration of a power machine control system of the power machine shown in FIG. 4.
Figure 6:
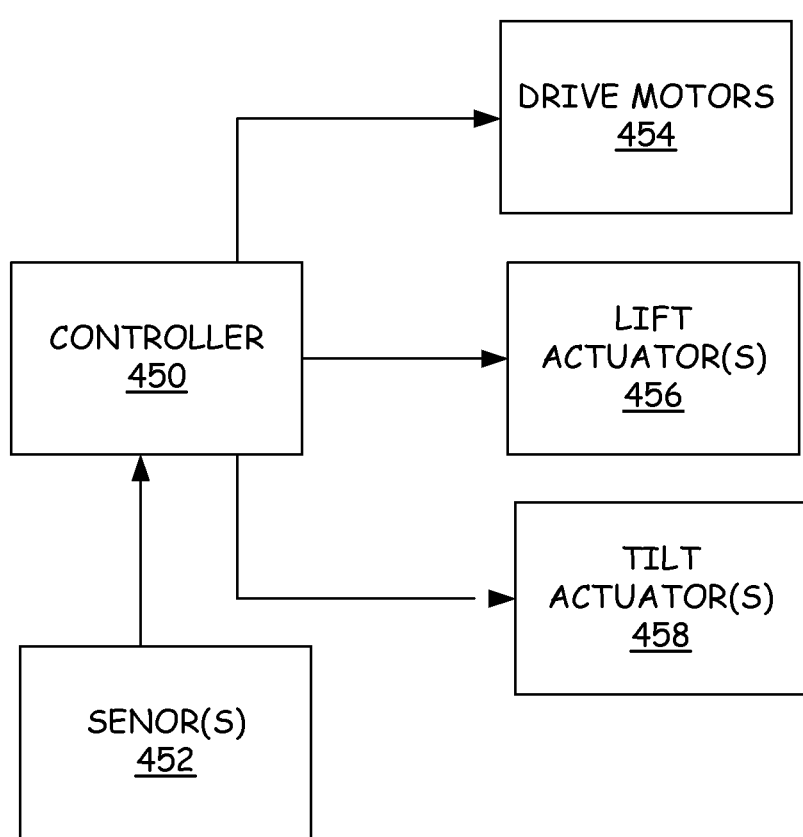
FIG. 6 is an illustration of components of a control system shown in FIG. 5 in one exemplary embodiment.

Referring now to FIG. 4, shown is a diagrammatic top view illustration of a power machine 300, in the form of a loader, having an implement carrier 370 to which an implement 305, in the form of a bucket, is to be automatically coupled. Power machine 300 has a control system 400, an embodiment of which is shown in FIG. 5, configured to guide the loader to the implement for attachment, and to control lift and tilt functions as necessary to complete the coupling of the implement to the implement carrier. In an illustrative embodiment, the control system 400 can be implemented in a controller 450 as shown in FIG. 6, using inputs from one or more sensors or sensor systems 452 such as a light detection and ranging (LIDAR) sensor system. Controller 450 controls drive motors 454 for movement of the loader relative to support surface, lift actuator(s) 456 for raising and lowering a lift arm, and tilt actuator(s) 458 for rotating the implement carrier 370.

FIG. 4 illustrates a global coordinate system for implementing the automatic control by the control system 400. The coordinate system includes an origin 310 and a center of rotation 312 of the loader. The distance R is the distance between the point of attachment 314 on the loader and the center of rotation 312 of the loader. According to this coordinate system, the state, x, will be given by:

$$x = [x \ y \ \theta]$$

Thus, the desired state will always be $x_{des} = [0 \ 0 \ 0]$, which would mean the origin 310 and center of rotation 312 would be on top of one another and $\theta$ would be 0. In this position, the loader 300 is lined up for connecting to the implement.

Control System

Referring more specifically to control system 400 shown in FIG. 5, first step in implementing the control system is establishing communication with the loader 300. The communication for implementing the control functions of control system 400 can be in the form of any suitable communication technology and protocol which allow control messages to be sent, via a communication link, to the drive system (e.g., drive motors 454) and/or the lift arm system (e.g., lift actuators 456 and tilt actuators 458).

Control system 400 is of a type in which a feedback control loop is utilized in which a desired position state, $x_{des}$, of the loader is determined and compared to a current position state estimate 2 of the loader generated by a state estimator 402. The desired position state $x_{des}$ of the loader can be determined using any suitable sensors or sensors systems 452 (shown in FIG. 6) which can identify a position of the implement to be coupled to the implement carrier of the power machine.

The sensors or sensor systems are also utilized in the state estimator 402, which can be a suitably configured controller or other discrete circuitry, to estimate the current position state 2 of the loader. Again, any suitable sensors or sensor systems can be used. Sensors are important for calculating state estimates of the position of the loader in relation to the implement, and the information from the sensors cab be used for dynamic modeling as well as state estimation. Examples of sensors systems which can be used include RFID localization systems, infrared localization systems, video sensor systems with image recognition and processing systems, video sensor systems utilizing tagging systems, LIDAR systems, 3D time of flight (ToF) Camera systems, etc.

Once the current position state estimate, 2, of the loader has been generated, the difference between the current position state and the desired position state $x_{des}$ can be determined. This difference, e, is then provided to the controller 450, which determines the control input, u, made up of the linear and rotational velocities, ($v_{des}$ and $\omega_{des}$, respectively) required for the loader to move toward the desired position. These desired velocities can then be translated to command values 406 by a dynamic vehicle model 404, examples of which are discussed below. The command values can be sent to the loader using any suitable communication protocol or system, for example using CAN messages in some embodiments. This process repeats until the loader 300 has reached its desired state position.

Proportional Controller

Figure 7:
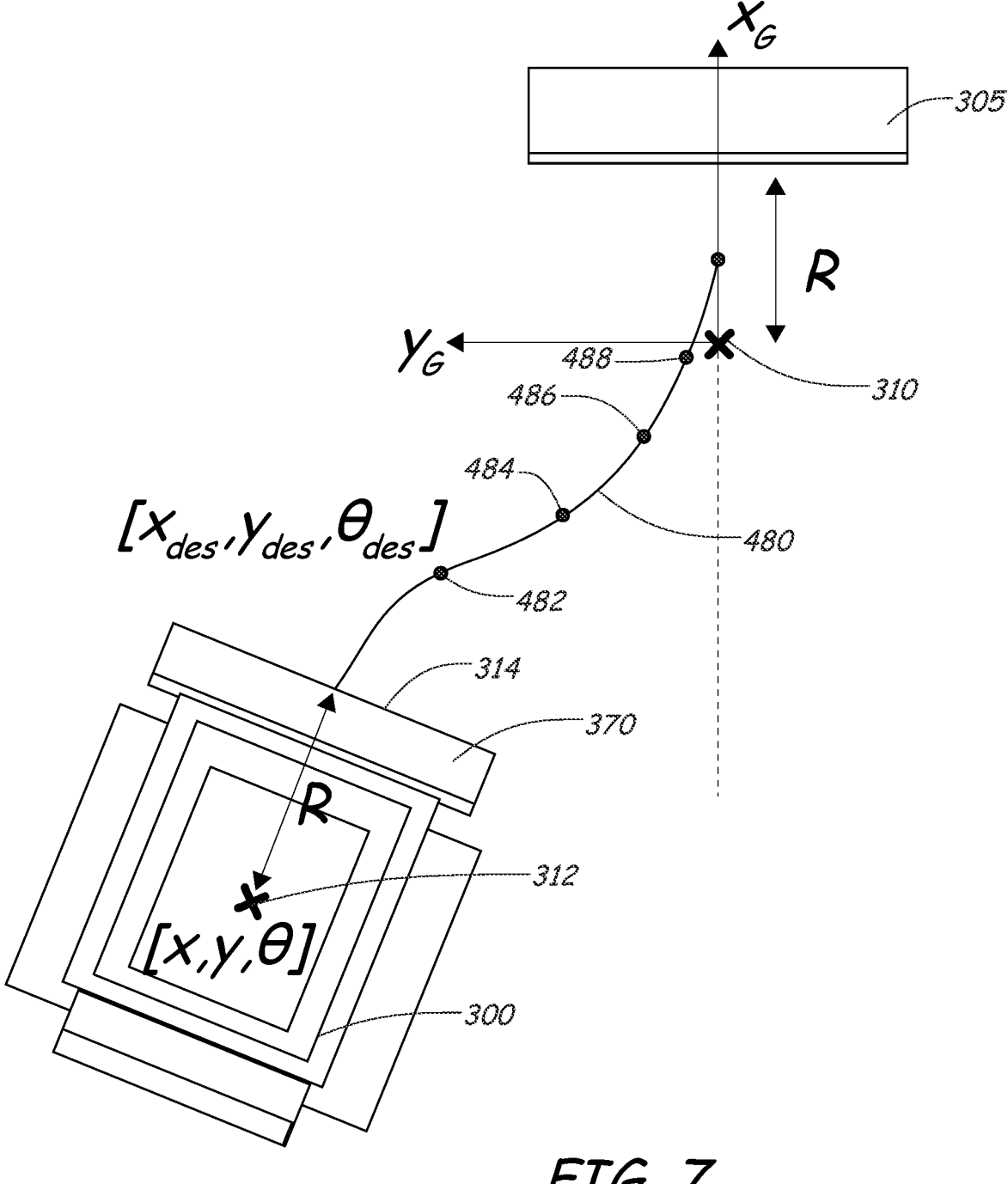
FIG. 7 is an illustration of a loader and a coordinate system utilized by the loader control system in an exemplary embodiment.

In some embodiments, the control system 400 utilizes a proportional controller. Referring now to FIG. 7, shown is the loader 300, implement 305 and coordinate systems discussed above with reference to FIG. 4. Also shown is a path 480 for the loader 300 to maneuver toward the implement 305 such that the implement can be automatically coupled onto implement carrier 370. The proportional controller uses the sensors or sensor systems 452 to obtain data indicative of the position of the loader 300 relative to the implement 305. From this data, a line is fit to the implement as perceived by the sensor system, with the middle of the implement as the origin. The data is processed with the format [x y θ] where the controller will seek to achieve the position [0 0 0], such that the implement carrier 370 is perpendicular to the body of the back of the implement, which is the ideal position for coupling. FIG. 7 shows the basic process for this controller where the center of rotation 312 is the current state of the loader, the position 482 is the next desired state, and the positions 484, 486, 488 are the subsequent desired states to be calculated on later iterations by the controller until the loader 300 reaches the position 310.

Figure 8:
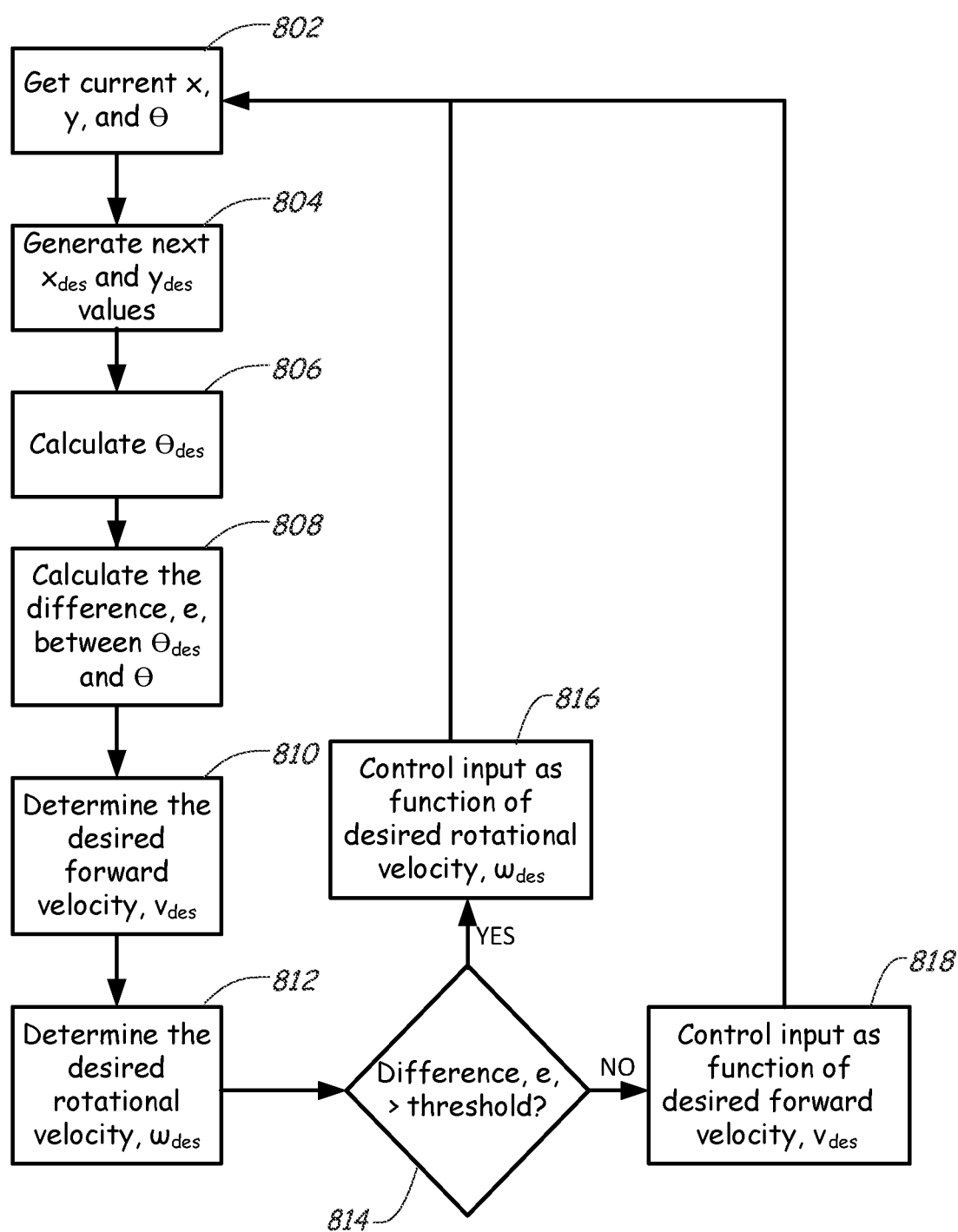
FIG. 8 is a flow diagram illustrating steps of a method of autonomous control in one exemplary embodiment.

In an exemplary embodiment, to implement these steps using a proportional controller, the controller can implement the following steps as illustrated in the flow diagram of FIG. 8. First, x, y, and θ as shown at block 802 is obtained from sensor data. Next, as shown at block 804 $x_{des}$ and $y_{des}$ values are generated just ahead of current values (e.g., values 484 just ahead of values 482 as shown in FIG. 7) that move the loader toward the bucket or implement. Then, at block 806, desired angle $\theta_{des}$ is calculated (as shown at step 806) by finding atan 2($y_{des}$-y, $x_{des}$-x). At block 808, the controller calculates the difference, e, between $\theta_{des}$ and θ. The difference, e, can be wrapped or bounded such that it is between two boundary values, for example such that it is between π and −π.

The desired forward velocity $v_{des}$ is then calculated as is shown at block 810. The desired forward velocity can be determined, for example, by $$v_{des}=K_v\sqrt{(x-x_{des})^2+(y-y_{des})^2}.$$

At block 812, the desired rotational velocity $\omega_{des}$ is determined for example, by $\omega_{des}=K_\omega e$.

At block 814, it is determined if difference, e, is greater than a given threshold value. If e is greater than the threshold a control input is calculated as a function of desired rotational velocity, $\omega_{des}$ as shown at step 816. Otherwise, a control input is calculated as a function of desired, $v_{des}$ (as shown at step 818). The method described at blocks 802-818 are then repeated after holding the control input for a set time.

The controller can be experimentally adjusted to find the best proportional gain constants, $K_v$ and $K_\omega$, as well as the best e threshold for deciding when to rotate versus go forward (as only one can be done at a time) and the best length of time to hold the control input for before starting the calculations again.

Computer simulations verify the performance and function of the controller and demonstrate achievement of the expected behavior of the loader. Additionally, simulation can be very helpful for fine tuning the controller, as small adjustments can be implemented easily and observed almost immediately. The simulation works by passing the loader position to the controller where it then chooses to either turn the loader or move linearly, based upon a threshold in degrees. If the loader's angular position is greater than this threshold, the loader will turn rather than move linearly. The controller takes the position input and returns either an angular or linearly velocity, based upon the threshold. The simulation then multiplies this velocity with a user chosen time step, for this simulation it was 0.1 seconds, to obtain the change in position. The loader's position is updated and the process repeats passing in the new x and y coordinates as inputs.

Point Tracking Controller

According to the coordinate system shown in FIGS. 4 and 7, the loader's desired state is always [x y θ]$_{des}$=[0 0 0]. Assuming the state estimator 402 gives the current state of the loader, a point-tracking controller can be used to get the loader to the desired state. To use a point-tracking controller, the following parameters can be defined:

$$\rho=\sqrt{\Delta x^2+\Delta y^2}$$ (Parameter Equation 1)

$$\alpha=-\theta+\text{atan }2(\Delta y,\Delta x)$$ (Parameter Equation 2)

$$\beta=-\theta-\alpha$$ (Parameter Equation 3)

Figure 9:
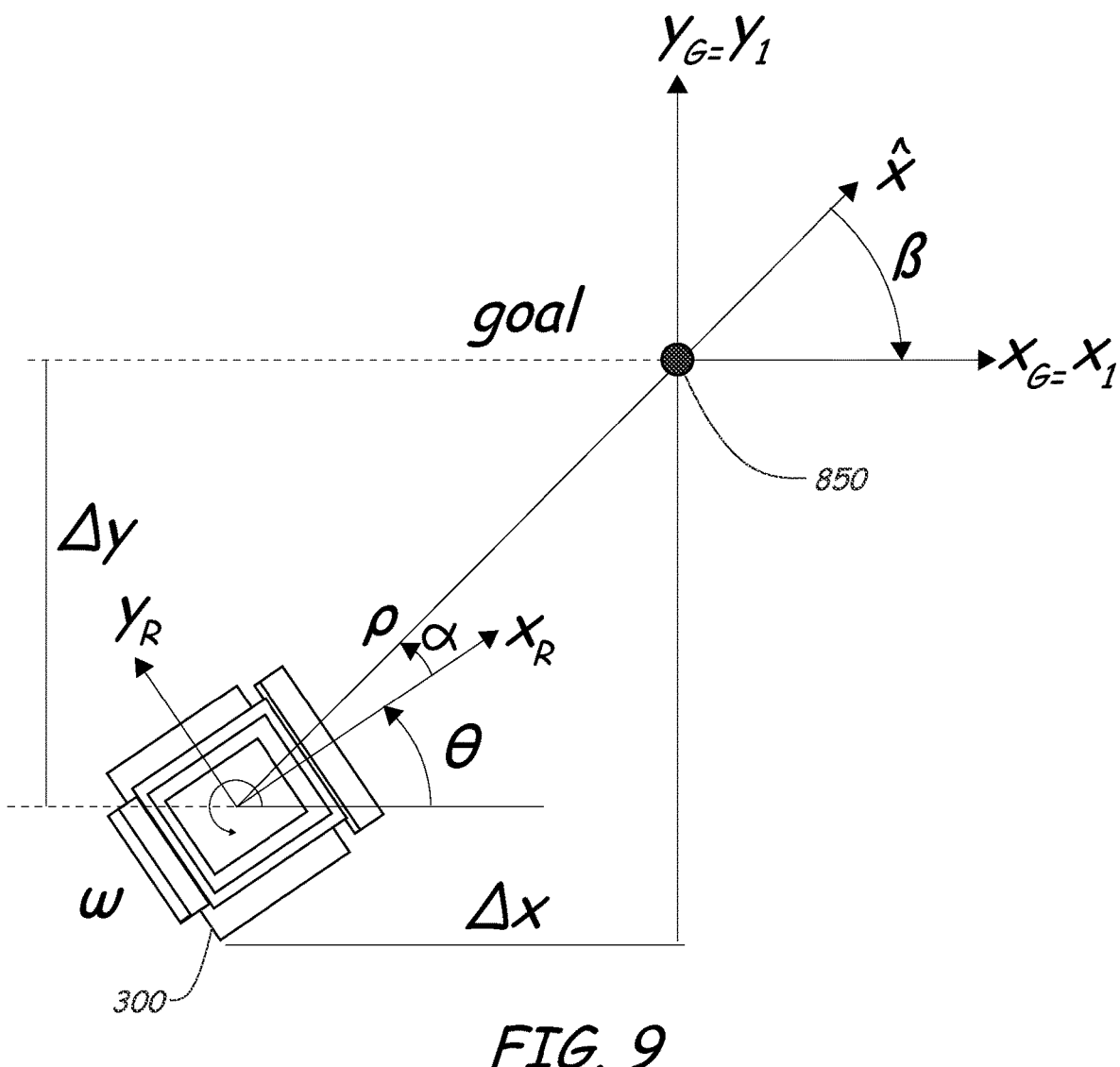
FIG. 9 is a diagrammatic illustration of parameters used by a point tracking controller in one exemplary embodiment of the present disclosure.

These parameters are also shown in FIG. 9 where the "goal" node 850 is the next node in the path the loader 300 must get to. If the next node is behind the loader (a is not between $-\pi/2$ and $\pi/2$), then Parameter Equation 2 would be modified to use $-\Delta y$ and $-\Delta x$. After calculating these parameters, they can be used to find the desired linear velocity v and rotational velocity co:

$$v = k_\rho \rho$$

$$w = k_\alpha + k_\beta \beta$$

where the control gains, $k_\alpha$ and $k_\beta$, are bounded for purposes of stability but must be experimentally determined. By following these probabilistic road map and point-tracking processes, the controller can turn the difference between the current state and goal state into linear and rotational velocities that will ultimately guide the loader to the desired site for attachment. These velocities are then translated into messages, such as CAN messages, that can be communicated to systems of the loader. For example, a CAN message requires a magnitude called a command value. To determine the relationship between the desired velocities and these command values, dynamic modeling tests are performed.

PID Controller

Figure 16:
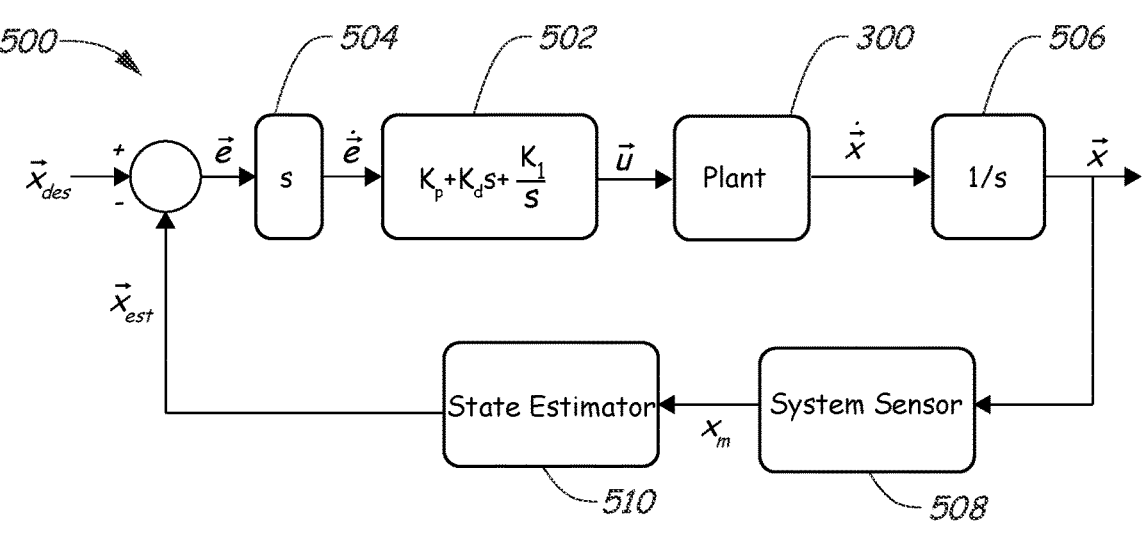
FIG. 16 is an illustration of another embodiment of the power machine control system, using a PID controller, of the power machine shown in FIG. 4.

In some exemplary embodiments, instead of a control system 400 using a proportional controller, the loader 300 instead utilizes a control system utilizing a proportional, integral, derivative controller (PID controller). The PID controller is similar to the proportional controller, but also takes into consideration an integral term and a derivative term. As shown in FIG. 16, control system 500 includes a PID controller 502, a differential term block or generator 504, and an integral term block or generator 506. Like the proportional controller, the PID controller seeks to navigate the loader to the implement to begin the coupling process and provides commands to the plant, in this case loader 300, to accomplish this task. The integral term in the PID controller, generated by generator 506, takes into account previous values, integrating them over time accounting for error from the desired position. The derivative term in the PID controller, generated by generator 504, seeks to predict future values and incorporate those into to create a better control estimate. The respective gains of differential term block 504 and integral term block 506 are introduced into the PID controller 502. In FIG. 16, a sensor or sensor system 508 of any acceptable type for providing accurate position data provides current measured position data $\chi_m$, which the state estimator 510 uses to generate current position state estimate, $\hat{x}$. As with control system 400, in control system 500, the desired position state, $x_{des}$, of the loader is determined and compared to current position state estimate 2 to generate a tracking error e used by the differential term block 504 and the PID controller 502.

Sequential PID Controller

Figure 17:
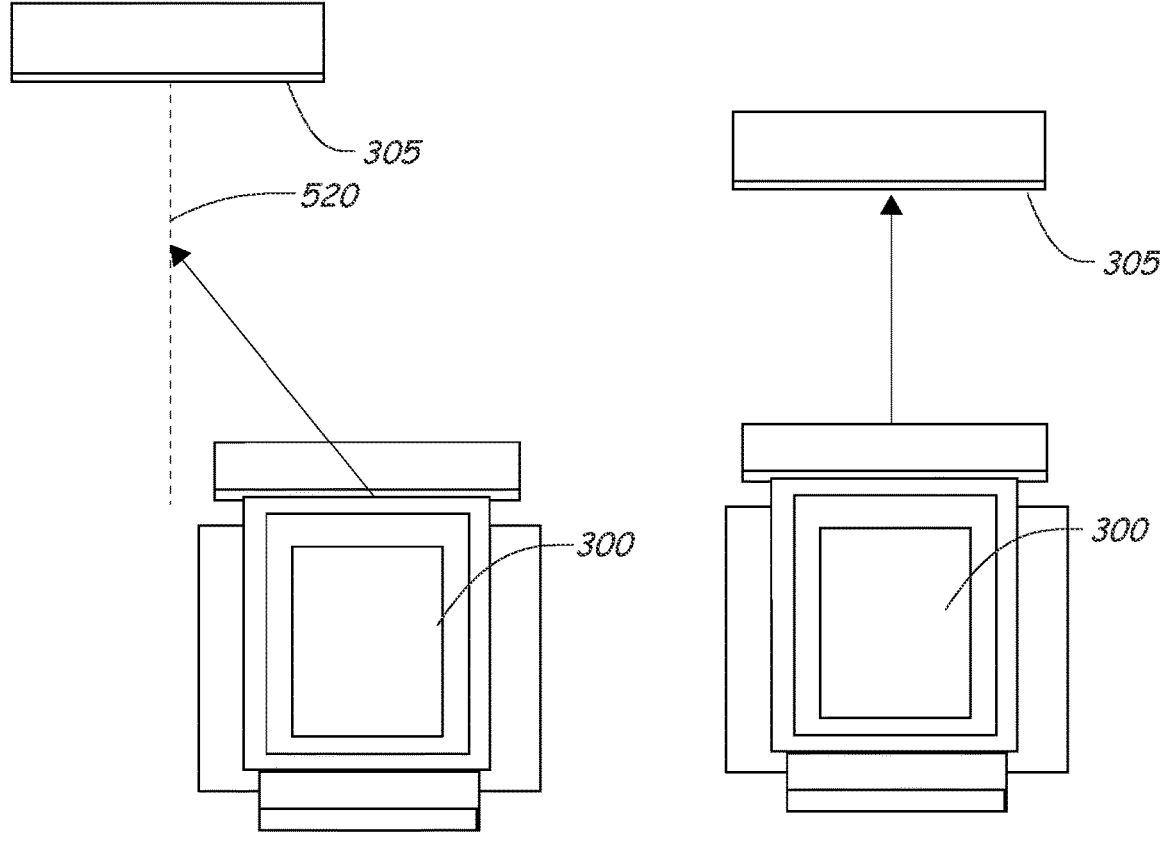
FIG. 17 is an illustration of control of a power machine using two stages of a sequential PID controller.

In some exemplary embodiments, the control system uses a two-stage system of PID controllers, referred to here as a Sequential PID controller, or SPID controller. Each stage has a PID controller for linear and rotational motion. The first stage seeks to move the loader 300 onto the perpendicular bisector 520 of the implement 305 as can be seen at the left in FIG. 17. Once the loader is centered on the perpendicular bisector 520 as shown at the right in FIG. 17, the second stage of the controller moves the loader to the mating position in front of the implement.

In both of these stages there are two PID controllers, one PID controller for linear motion and one PID controller for rotational motion. In the first stage, the rotational controller takes priority over the linear controller. That is to say, the loader will turn until it is directly facing the desired point on the perpendicular bisector, at which point it will start moving forward. In the second stage, both the linear and rotational controllers operate simultaneously sending linear and rotational commands. In the first stage, the controller seeks to move the center of the loader onto (x2, y2), a point on the perpendicular bisector 520. To accomplish this task the following Sequential PID Equations were used:

$$y_b = m_b x_b + c_b \qquad \text{(Sequential PID Equation 1)}$$

$$y_p = \frac{-1}{m_b} x_p + c_p \qquad \text{(Sequential PID Equation 2)}$$

$$l = 0.75 \sqrt{x_1^2 + y_1^2} \qquad \text{(Sequential PID Equation 3)}$$

$$c_p = y_1 + \frac{1}{m_b} x_1 \qquad \text{(Sequential PID Equation 4)}$$

$$x_2 = x_1 - \frac{l}{\sqrt{1 + \frac{1}{m_b^2}}} \qquad \text{(Sequential PID Equation 5)}$$

$$y_2 = \frac{x_1 - x_2}{m_b} + y_1 \qquad \text{(Sequential PID Equation 6)}$$

Sequential PID Equation 1 gives the equation of the lines for the implement. Sequential PID Equation 2 gives the equation for the perpendicular bisector 520 of the implement. Sequential PID Equation 4 is the y intercept of the perpendicular bisector of the bucket. Sequential PID Equation 3 gives the value for 1. Sequential PID Equations 5 and 6 illustrate how to find the values of $x_2$ and $y_2$ that the loader is attempting to localize to.

The loader seeks to get to the calculated position $(x_2, y_2)$ in the first stage of the controller. This is performed repeatedly, whereby Sequential PID Equations are calculated each time the control loop is run. The angle that the center of the loader makes with $(x_2, y_2)$ is calculated, and the rotational PID controller is engaged to make that angle zero. Once the angle becomes smaller than a threshold (e.g., 0.05 radians), the forward motion PID controller is engaged.

The control system can also check for the perpendicular distance the loader's center makes to the perpendicular bisector. Once this distance is less than a threshold amount, e.g., 300 mm, the second stage can be initiated. The second stage seeks to get the loader to the coupling position in front of the implement. It is noted that, in some embodiments, the stage at which the controller operates depends only on the current location of the loader, and does not depend on the stage the controller operated in during the previous time step.

Dynamic Modeling

Once the position of the implement relative to the loader is known, the control system needs to decide what movement the loader should do next to get to the implement. To determine what the loader should do next, the motion of the loader must first be characterized. For tracked loaders, two large tracks span the sides of the loader. Unlike skid steer loaders that are equipped with four wheels, the tracks allow for even pressure distribution along the length of the entire vehicle, making it more suitable for driving on uneven grounds. To characterize the behavior of the track loader, two dynamic models are used: one for the forward movement of the loader and one for the rotational movement. The goal is to obtain an equation of the form:

$$v(t) = m_v u_v + b_v \begin{cases} m_v \text{ and } b_v \text{ are experimentally determined} \\ u_v \text{ is the input magnitude (between 0 and 1023)} \\ v(t) \text{ is the forward velocity} \end{cases}$$

$$w(t) = m_w u_w + b_w \begin{cases} m_w \text{ and } b_w \text{ are experimentally determined} \\ u_w \text{ is the input magnitude (between 0 and 1023)} \\ w(t) \text{ is the forward velocity} \end{cases}$$

These equations relate the output velocity, either forward or rotational, as a function of the input magnitude. By superimposing the results for each, the full behavior can be modeled. Since the goal is to use the dynamic model within the controller, the above two equations will need to inverted. Using the same variables as in the previous equation, the new form would be:

$$u_v = \frac{1}{m_v} v(t) + \frac{b_v}{m_v} \begin{cases} m_v \text{ and } b_v \text{ are experimentally determined} \\ u_v \text{ is the input magnitude (between 0 and 1023)} \\ v(t) \text{ is the forward velocity} \end{cases}$$

$$u_w = \frac{1}{m_w} w(t) + \frac{b_w}{m_w} \begin{cases} m_w \text{ and } b_w \text{ are experimentally determined} \\ u_w \text{ is the input magnitude (between 0 and 1023)} \\ w(t) \text{ is the forward velocity} \end{cases}$$

which yields the input command as a function of the forward or rotational velocity. To determine the values for the constants in this equation, experiments were conducted. For consistency across tests, a set of fixed variables were used:

The ground is made of asphalt

The ground is level to within ±3° in all directions

The loader is facing the planar landmark

Both the linear and rotational modeling tests include sending a joystick command value, $u_v$ or $u_w$, through any communication channels, for example in CAN message form. A sensor or sensor system can be mounted near the front of the loader, its axis lined up with that of the loader. The sensor's output is captured and then processed to obtain the velocity.

Linear Velocity Test

To determine what linear velocity of a particular loader corresponds to each of the joystick command values, a linear velocity test can be performed. In an exemplary embodiment, the joystick command value is in the form of a number between 0 and 1023. Command values from 0 to 511 represent a reverse velocity, while those from 513 to 1023 represent a forward velocity, with 512 being the value for neutral. It should be noted that the loader does not immediately move at input values near 512. Threshold values were experimentally calculated for both the forward and reverse motions. The loader begins to move at 25% (command value: 640) and 33% (command value: 343) in the forward and reverse directions, respectively.

The linear velocity modeling test includes driving the loader toward and away from a vertical, flat, and stationary surface called a planar landmark. In one example, while moving, the loader stays within 20 cm and 5 m of the planar landmark because the sensor system is accurate within this range.

Linear Velocity Model

The minimum value of the sensor's output at each time step represents the perpendicular distance between the sensor and the planar landmark. The output can be processed to obtain a linear fit of the perpendicular distance versus time.

It is assumed that for a fixed command value the velocity of the loader will be fixed. Since the slope is the rate of change of distance over time, it is also the velocity. Thus, the slope of the linear fit is the output velocity for the corresponding command value.

To complete the linear velocity model, the output velocity is measured for different command values above the thresholds discussed above with reference to the Linear Velocity Test. The loader will not begin moving immediately at 511 and 513 because the loader has to first overcome the friction that allows it to move. The threshold values represent the command value necessary for the loader to overcome this friction. It is assumed that the velocity versus command value relationship is linear for the most part, but it behaves differently near the threshold value because friction plays a much bigger part at slower speeds. To test this assumption and create the model, more data points are taken closer to the threshold value and distributed evenly further away from the threshold. In one example embodiment, three velocity measurements are collected for each of multiple different command values. For each input, an average is calculated using the three velocity measurements and then plotted against its corresponding command value.

Figure 10:
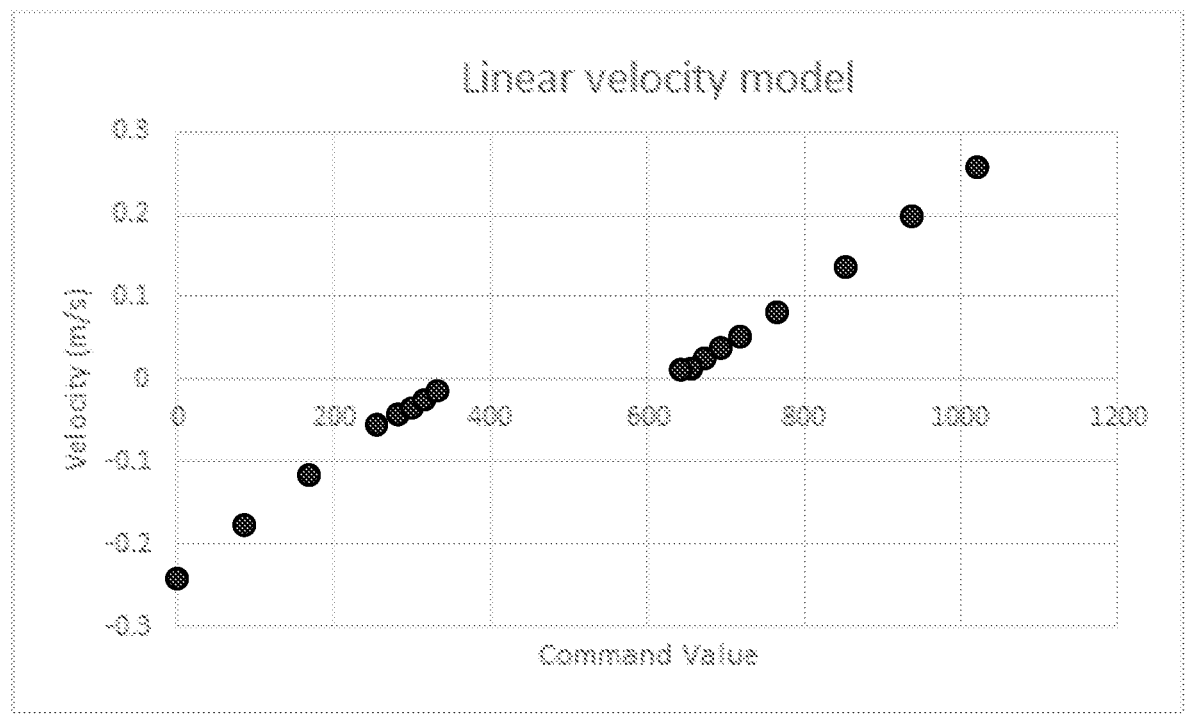
FIG. 10 is a plot illustrating a set of linear velocity dynamic model data in one exemplary embodiment.
Figure 11:
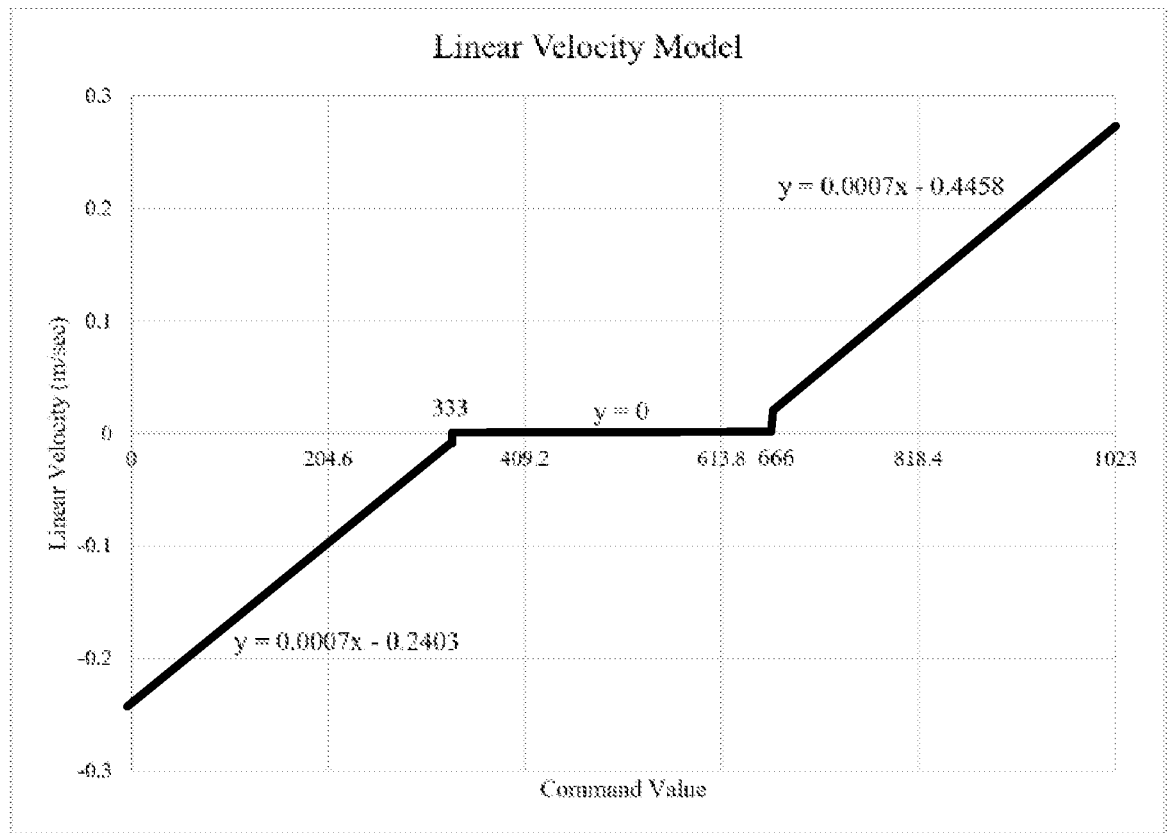
FIG. 11 illustrates a complete piecewise linear velocity model for the data shown in FIG. 10 in one exemplary embodiment.

The slope of the linear fit is measured to estimate linear velocity. Three of these velocity measurements for a particular command value are averaged to yield that command value's velocity for the dynamic model for linear motion. FIG. 10 shows the complete set of linear velocity dynamic model data in one exemplary embodiment. This fit shows that near the threshold values the relationship between velocity and command value is nonlinear as expected. At these values, the assumption that for a fixed command value the velocity is constant breaks down. This breakdown in the assumption could be because of two reasons. First, at such low command values the friction between the tracks and the ground exert a significant force when compared to the force exerted by the motors. Second, the loader may not have been designed to work at lower command values explaining the erratic behavior. Therefore, small changes in ground condition can impact the motion of the loader. It was observed that the ground condition could get the loader to a complete halt at command values near the threshold. Thus, the linear portions of the model can be used for determining command values for linear motion. The complete piecewise linear velocity model with fits in shown in FIG. 11 for this example embodiment.

The controller calls for the command value as a function of desired linear velocity, which is given by taking the inverse of the piecewise equation given by the model. Given a particular forward velocity, the approximate command value, $c_v$, necessary can be found using the equation shown below:

$$cv = \begin{cases} 1429 v_{des} + 637 & 0.058 \text{ deg/s} \leq \omega_{des} \leq -0.270 \text{ m/s} \\ undef & 0.058 \text{ deg/s} \leq \omega_{des} \leq -0.061 \text{ m/s} \\ 1429 v_{des} + 343 & -0.240 \text{ deg/s} \leq \omega_{des} \leq -0.061 \text{ m/s} \end{cases}$$

The command value $u_v$ is undefined for $0.058 \text{ m/s} \leq v_{des} \leq -0.061$ m/s as the torque provided by the loader is not enough to overcome its internal resistance.

Angular Velocity Test

The objective of this test is to discover the angular velocities corresponding to each of the joystick command values. In one example embodiment, the joystick command value is in the form of a number between 0 and 1023. Command values from 0 to 511 represent rotation to the left, while those from 513 and 1023 represent rotation to the right, with 512 being the value for neutral. The loader does not immediately move at command values near 512. In the example embodiment, threshold values are experimentally calculated for both the right and left rotational motions. The loader begins to rotate at 79.5% (command value: 919) and 79.5% (command value: 105) to the right and left, respectively.

The angular velocity modeling test included rotating the loader near a vertical, flat, and stationary surface (planar landmark). While rotating, in the example embodiment the loader stays within 20 cm and 5 m of the planar landmark, because the sensor used was accurate within this range.

Angular Velocity Model

Figure 12:
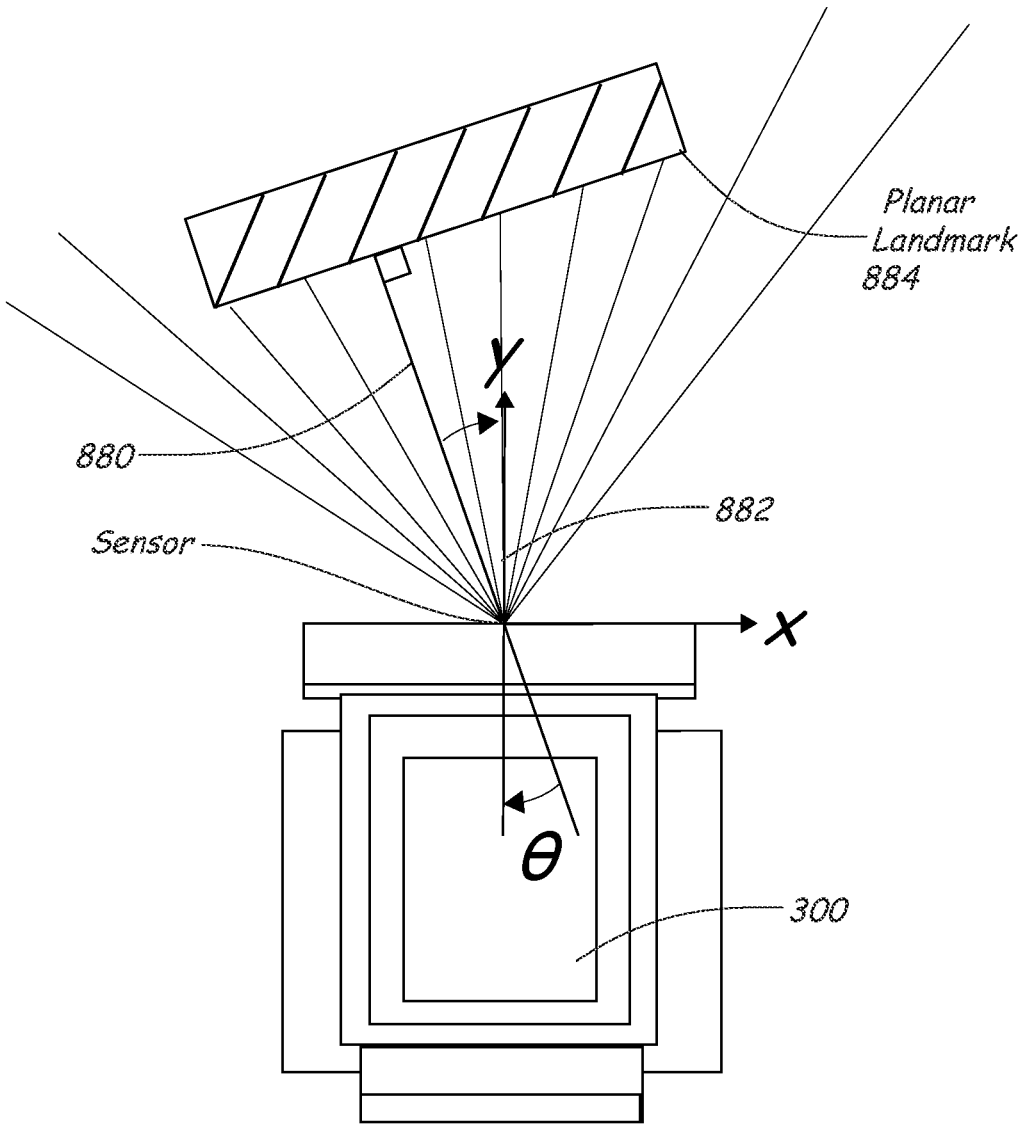
FIG. 12 is an angular dynamic model capture diagram in accordance with one exemplary embodiment.

The angular velocity of the loader is found by calculating the rate of change of the implement's orientation relative to the loader (seen in FIG. 12 as the rate of change of the angle between the line 880 orthogonal to the planar landmark 884 and the ^y axis 882). To get the orientation, the distance data from the sensor is processed to give the corresponding x and y coordinates of each time step. The data is filtered to capture only the coordinates corresponding to the flat surface. A linear fit is passed to obtain the profile of the at surface (as shown by FIG. 12)

Figure 13:
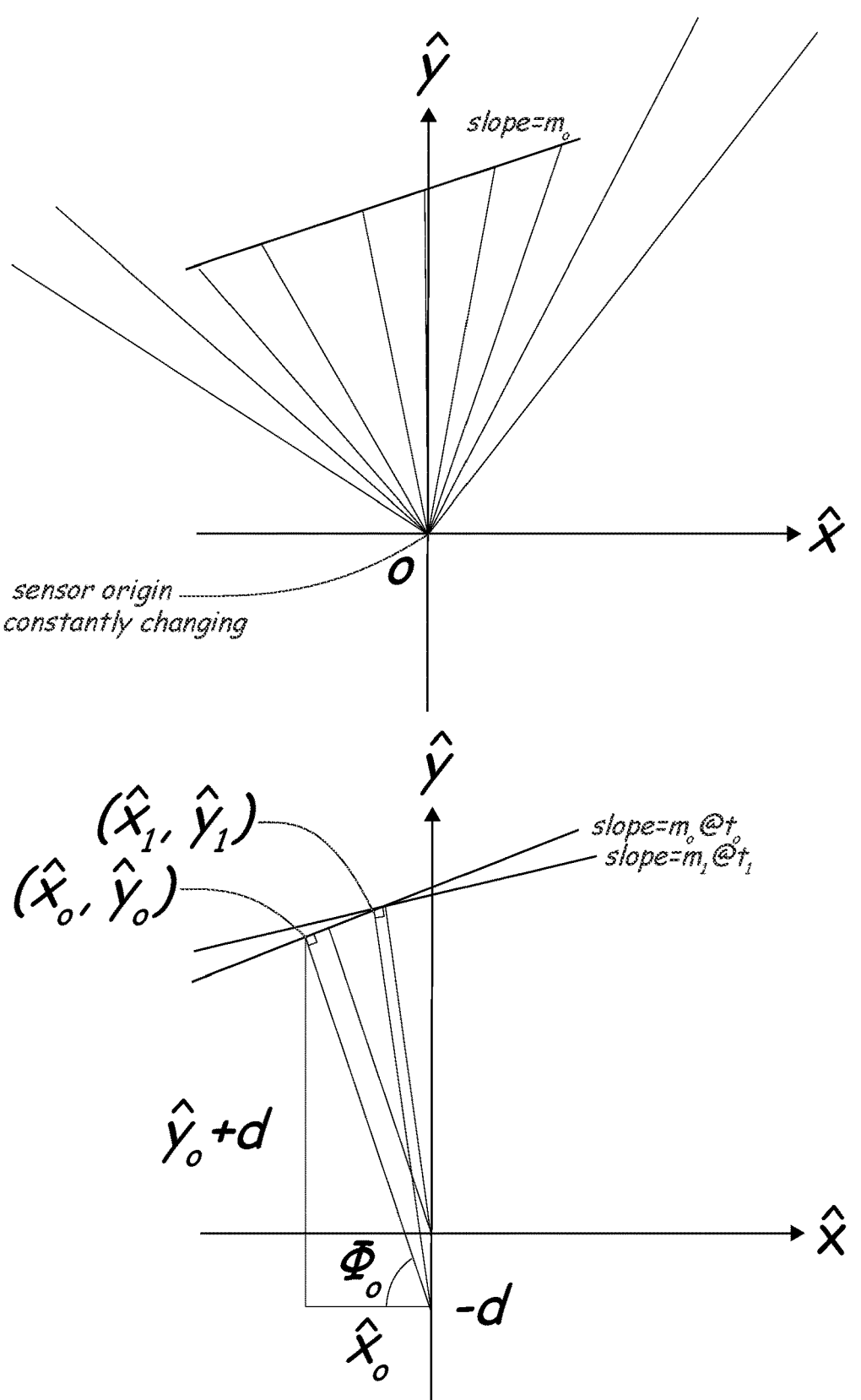
FIG. 13 is a plot illustrating change in angle calculations in accordance with one exemplary embodiment.

As shown in FIG. 13, the slope of the profile is calculated at particular time steps. The equation for the angle is given by $$\Phi_t = \tan^{-1}\left(\frac{\hat{y}_t + d}{\hat{x}_t}\right)$$

The angular velocity is then found by taking the difference of the angle formed by the two lines and then dividing it by the difference in the two time steps (time taken for the angle to change). This is repeated a predetermined number of times, for example 10 times, at different input magnitude commands and the average angular velocity, $\overline{\omega}_t$, is taken.

Figure 14:
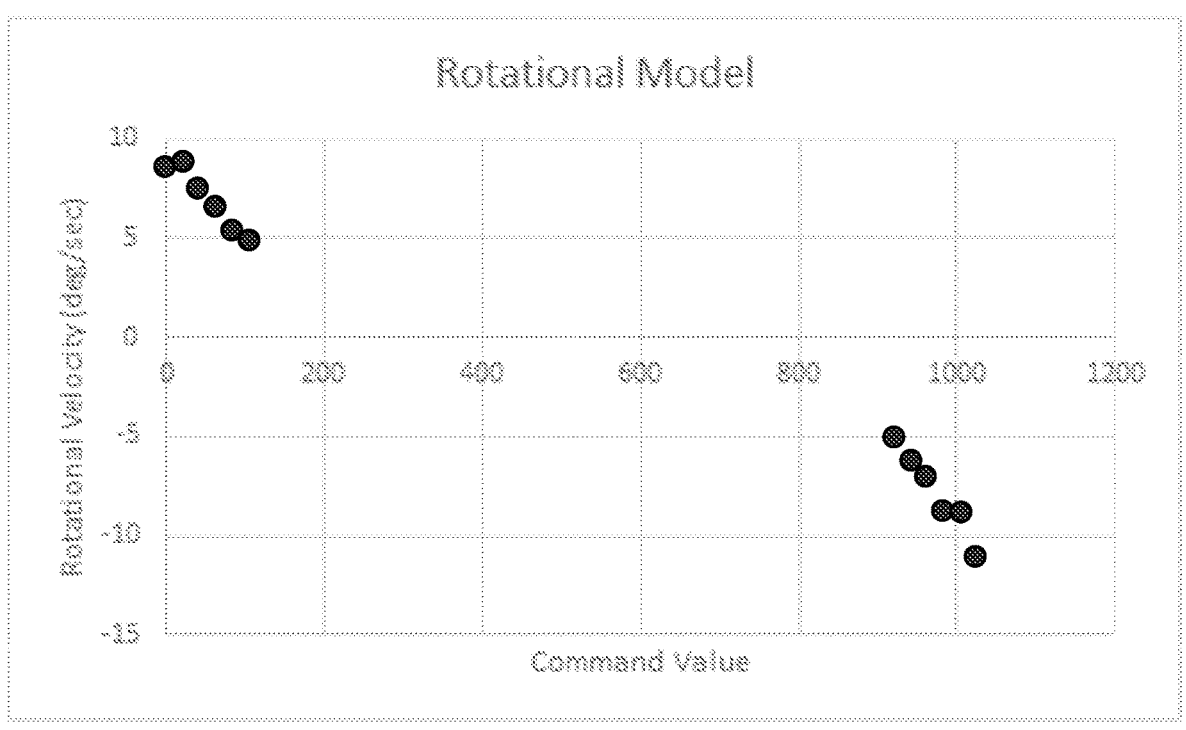
FIG. 14 is a rotational model plot of rotational velocities to command values in accordance with one exemplary embodiment.

The changing slope of the linear fit of the planar landmark is the same change in the loader's heading angle over time. The change in heading over time is the loader's angular velocity for the corresponding command value. Once the threshold value has been overcome, the loader rotates freely, meaning that it has the necessary torque to overcome the slippage of the tracks that occurs during rotation. Before the threshold value, however, the loader does not rotate and the noise that the motor makes is an indication that it does not have the necessary torque to begin to rotate. Thus, unlike the linear velocity test, there is no need to collect more data points near the threshold value. In one example embodiment, three velocity measurements are collected for each different command value. An average is calculated using the three angular velocity measurements and then plotted against its corresponding command value. This plot is shown in FIG. 14 for one example.

Figure 15:
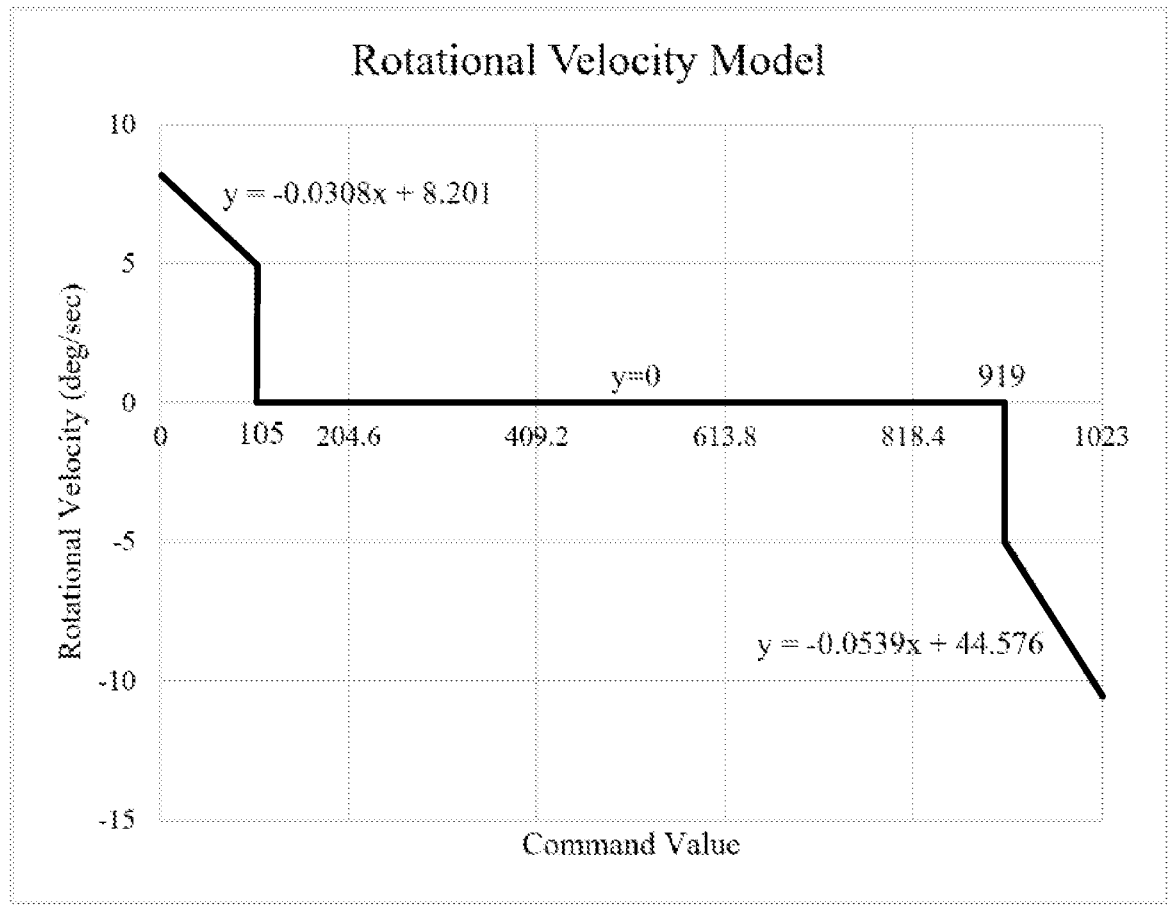
FIG. 15 is a complete piecewise linear rotational velocity model for the data shown in FIG. 14 in one exemplary embodiment.

Similar to the linear model, at low command values the friction between the tracks and the ground exert a significant force when compared to the force exerted by the motors. Therefore, small changes in ground condition can impact the motion of the loader. It was observed that the ground condition could get the loader to a complete halt at command values near the threshold. Thus, the linear portions of the model can be used for determining command values for rotational motion. These linear portions of the model and their fits are used to construct the complete rotational model shown in FIG. 15.

The controller calls for the command value as a function of desired rotational velocity, which is given by taking the inverse of the piecewise equation given by the model. Given a particular angular velocity, the approximate command value, cv necessary can be found using the following equation:

$$cv = \begin{cases} -19\omega_{des} + 827, & -10.564 \ deg/s \le \omega_{des} \le -4.958 \ deg/s \\ undef, & -4.958 \ deg/s \le \omega_{des} \le 4.967 \ deg/s \\ -32\omega_{des} + 266, & 4.967 \ deg/s \le \omega_{des} \le 8.201 \ deg/s \end{cases}$$

Although the present invention has been described with reference to preferred embodiments, workers skilled in the art will recognize that changes may be made in form and detail without departing from the scope of the discussion.

What is claimed is:

1. A power machine comprising:

a frame;

a power system supported by the frame;

a traction system supported by the frame and powered by the power system to controllably propel the power machine over a support surface, the traction system including drive motors configured to cause the traction system to move the power machine over the support surface;

an implement interface including an implement carrier configured to receive and secure an implement to the power machine;

a lift arm assembly having at least one lift arm which supports the implement interface;

at least one lift actuator coupled to the lift arm assembly and to the frame and configured to raise and lower the at least one lift arm;

at least one tilt actuator coupled to the implement interface and to the lift arm assembly and configured to rotate the implement carrier relative to the lift arm assembly;

a sensor system configured to provide data indicative of a position of the power machine relative to the implement;

a control system configured to control the traction system to automatically guide the power machine to the implement and to control the power machine to automatically couple the implement to the implement carrier, wherein the control system is configured to control the drive motors, as a function of the position of the power machine relative to the implement as indicated by the data from the sensor system, to automatically guide the power machine to the implement, and wherein the control system is further configured to automatically control the at least one lift actuator to raise or lower the at least one lift arm for automatic coupling of the implement to the implement carrier, and to automatically control the at least one tilt actuator to rotate the implement carrier while automatically coupling the implement to the implement carrier, wherein the control system is configured to determine a desired position state of the power machine and to compare the desired position state to a current position state estimate of the power machine to determine a difference between the current position state estimate and the desired position state, the controller generating a control input, required to move the power machine, as a function of the difference between the current position state estimate and the desired position state.

2. The power machine of claim 1, wherein the control system is configured to determine the desired position state of the power machine using the data from the sensor system.

3. The power machine of claim 1, wherein the control system is configured to:

generate a current x position of the power machine, a current y position of the power machine, and a current angular position of the power machine relative to an angular position in which the power machine would be positioned for coupling the implement to the implement carrier;

generate a next desired x position of the power machine and a next desired y position of the power machine that move the power machine toward the implement;

calculate a desired angular position as a function of a difference between the desired y position and the current y position and as a function of a difference between the desired x position and the current x position;

calculate a difference between the desired angular position and the current angular position;

determine a desired forward velocity as a function of a difference between the current x position and the desired x position and as a function of a difference between the current y position and the desired y position;

determine a desired rotational velocity as a function of the difference between the desired angular position and the current angular position;

determine whether the difference between the desired angular position and the current angular position is greater than a threshold value;

generate the control input, required to move the power machine, as a function of the desired rotational velocity if the difference between the desired angular position and the current angular position is greater than the threshold value; and generate the control input, required to move the power machine, as a function of the desired forward velocity if the difference between the desired angular position and the current angular position is less than the threshold value.

4. The power machine of claim 1, wherein the control system is a proportional controller.

5. The power machine of claim 1, wherein the control system is a point tracking controller.

6. The power machine of claim 1, wherein the control system is a proportional integral derivative (PID) controller.

7. The power machine of claim 1, wherein the control system is a sequential proportional integral derivative (SPID) controller.

8. A method of coupling an implement to an implement carrier of a power machine, wherein the power machine comprises a lift arm assembly having at least one lift arm which supports the implement carrier, at least one lift actuator coupled to the lift arm assembly and to a frame and configured to raise and lower the at least one lift arm, and at least one tilt actuator coupled to the implement carrier and to the lift arm assembly and configured to rotate the implement carrier relative to the lift arm assembly, the method comprising:

obtaining data, from a sensor system, indicative of a position of the power machine relative to the implement;

controlling a traction system of the power machine, using a control system and as a function of the data indicative of the position of the power machine relative to the implement, to automatically guide the power machine over a support surface to the implement, wherein the traction system of the power machine further comprises drive motors configured to cause the traction system to move the power machine over the support surface, and wherein controlling the traction system further comprises using the control system to generate a control input, as a function of the position of the power machine relative to the implement as indicated by the data from the sensor system, and controlling the drive motors using the control input to automatically guide the power machine to the implement, wherein using the control system to generate the control input further comprises:

determining a desired position state of the power machine using the data from the sensor system;

comparing the desired position state to a current position state estimate of the power machine to determine a difference between the current position state estimate and the desired position state; and generating the control input as a function of the difference between the current position state estimate and the desired position state; and using the control system to automatically control the at least one lift actuator to raise or lower the at least one lift arm for automatic coupling of the implement to the implement carrier and to automatically control the at least one tilt actuator to rotate the implement carrier while automatically coupling the implement to the implement carrier when the power machine is in position proximate the implement.

9. The method of claim 8, and further comprising:

generating a current x position of the power machine, a current y position of the power machine, and a current angular position of the power machine relative to an angular position in which the power machine would be positioned for coupling the implement to the implement carrier;

generating a next desired x position of the power machine and a next desired y position of the power machine that move the power machine toward the implement;

calculating a desired angular position as a function of a difference between the desired y position and the current y position and as a function of a difference between the desired x position and the current x position;

calculating a difference between the desired angular position and the current angular position;

determining a desired forward velocity as a function of a difference between the current x position and the desired x position and as a function of a difference between the current y position and the desired y position;

determining a desired rotational velocity as a function of the difference between the desired angular position and the current angular position;

determining whether the difference between the desired angular position and the current angular position is greater than a threshold value;

generating the control input, required to move the power machine, as a function of the desired rotational velocity if the difference between the desired angular position and the current angular position is greater than the threshold value; and generating the control input, required to move the power machine, as a function of the desired forward velocity if the difference between the desired angular position and the current angular position is less than the threshold value.

10. The method of claim 8, wherein using the control system to generate the control input further comprises using a proportional controller to generate the control input.

11. The method of claim 8, wherein using the control system to generate the control input further comprises using a point tracking controller to generate the control input.

12. The method of claim 8, wherein using the control system to generate the control input further comprises using a proportional integral derivative (PID) controller to generate the control input.

13. The method of claim 8, wherein using the control system to generate the control input further comprises using a sequential proportional integral derivative (SPID) controller to generate the control input.

* * * * *